United States Patent
Corner et al.

(10) Patent No.: US 12,333,082 B2
(45) Date of Patent: Jun. 17, 2025

(54) SELECTABLE GESTURE DETECTION SYSTEM AND METHODS

(71) Applicant: Magna Electronics Inc., Auburn Hills, MI (US)

(72) Inventors: Allan Corner, Aurora (CA); Cuong Tran, Mississauga (CA); Earnest Lock, Markham (CA)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

(21) Appl. No.: 17/595,854

(22) PCT Filed: May 19, 2020

(86) PCT No.: PCT/CA2020/050673
§ 371 (c)(1),
(2) Date: Nov. 29, 2021

(87) PCT Pub. No.: WO2020/237348
PCT Pub. Date: Dec. 3, 2020

(65) Prior Publication Data
US 2024/0028126 A1 Jan. 25, 2024

Related U.S. Application Data

(60) Provisional application No. 62/854,675, filed on May 30, 2019.

(51) Int. Cl.
*G06F 3/01* (2006.01)
*B60K 35/00* (2024.01)
(Continued)

(52) U.S. Cl.
CPC .............. *G06F 3/017* (2013.01); *B60K 35/00* (2013.01); *G01S 7/415* (2013.01); *B60K 35/10* (2024.01); *B60K 2360/146* (2024.01)

(58) Field of Classification Search
CPC ... G06F 3/017; B60K 35/00; B60K 2370/146; G01S 7/415
See application file for complete search history.

(56) References Cited

U.S. PATENT DOCUMENTS 9,280,202 B2  3/2016  Gieseke et al.
9,470,033 B1 * 10/2016  Dudar ..................... E05F 15/73
(Continued)

FOREIGN PATENT DOCUMENTS

KR         101654694        11/2019
WO       2014172334 A1     10/2014
WO    WO-2018031516 A1 *   2/2018 ............. B60K 35/00

OTHER PUBLICATIONS

International Search Report and Written Opinion dated Aug. 3, 2020 from corresponding PCT Application No. PCT/CA2020/050673 and filed May 19, 2020.

*Primary Examiner* — Jean Paul Cass
*Assistant Examiner* — Lidia Kwiatkowska
(74) *Attorney, Agent, or Firm* — HONIGMAN LLP

(57) ABSTRACT

A detection system for a closure panel of a vehicle and corresponding method of operation are provided. The system includes a detection module including a sensor subassembly for detecting an object in a detection zone and sensing a motion and characteristics of the object and outputting a corresponding sensor signal. The system also includes a gesture selector for accepting a user input from a user to select a valid activation gesture and a controller arrangement coupled to the sensor subassembly. The controller arrangement receives the user input from the gesture selector and adjusts a plurality of predetermined thresholds representing the valid activation gesture by the user required to move the closure panel based on the user input. The controller arrangement analyzes the sensor signal and determines whether the sensor signal is within the plurality of (Continued)

predetermined thresholds and then initiates movement of the closure panel accordingly.

20 Claims, 33 Drawing Sheets

(51) Int. Cl.
*B60K 35/10* (2024.01)
*G01S 7/41* (2006.01)

(56) References Cited

U.S. PATENT DOCUMENTS

| | | |
|---|---|---|
| 9,701,258 B2 | 7/2017 | Tiryaki |
| 9,818,246 B2 | 11/2017 | Elie et al. |
| 9,982,474 B2 | 5/2018 | Dezorzi et al. |
| 10,137,777 B2 | 11/2018 | Lu et al. |
| 10,246,009 B2 | 4/2019 | McMahon et al. |
| 10,353,476 B2 * | 7/2019 | Raffa .................. G06F 3/0346 |
| 10,443,292 B2 | 10/2019 | Baruco et al. |
| 10,476,500 B2 | 11/2019 | Powell et al. |
| 10,589,716 B2 | 3/2020 | Sobecki et al. |
| 10,914,110 B2 | 2/2021 | Mitchell |
| 11,167,771 B2 | 11/2021 | Caron et al. |
| 2015/0009010 A1 | 1/2015 | Biemer |
| 2015/0009062 A1* | 1/2015 | Herthan .................. G01S 13/88 342/70 |
| 2015/0294169 A1 | 10/2015 | Zhou et al. |
| 2015/0296135 A1 | 10/2015 | Wacquant et al. |
| 2016/0137126 A1 | 5/2016 | Fursich et al. |
| 2017/0274906 A1 | 9/2017 | Hassan et al. |
| 2018/0170309 A1* | 6/2018 | McMahon .............. B60Q 1/503 |
| 2018/0238099 A1 | 8/2018 | Schatz et al. |
| 2019/0122056 A1 | 4/2019 | Tran et al. |
| 2019/0153770 A1* | 5/2019 | Mitchell .................. G01S 13/56 |
| 2019/0162010 A1 | 5/2019 | Rafrafi et al. |
| 2019/0162821 A1 | 5/2019 | Rafrafi et al. |
| 2019/0162822 A1 | 5/2019 | Rafrafi et al. |
| 2019/0309564 A1 | 10/2019 | Mitchell et al. |
| 2020/0018111 A1 | 1/2020 | Akbarian et al. |
| 2020/0143560 A1 | 5/2020 | Lu et al. |
| 2020/0157873 A1 | 5/2020 | Sabatini et al. |
| 2020/0202151 A1 | 6/2020 | Wacquant |
| 2020/0320320 A1 | 10/2020 | Lynam |
| 2021/0262274 A1 | 8/2021 | Schatz et al. |
| 2021/0291739 A1 | 9/2021 | Kasarla et al. |
| 2021/0323473 A1 | 10/2021 | Peterson et al. |

* cited by examiner

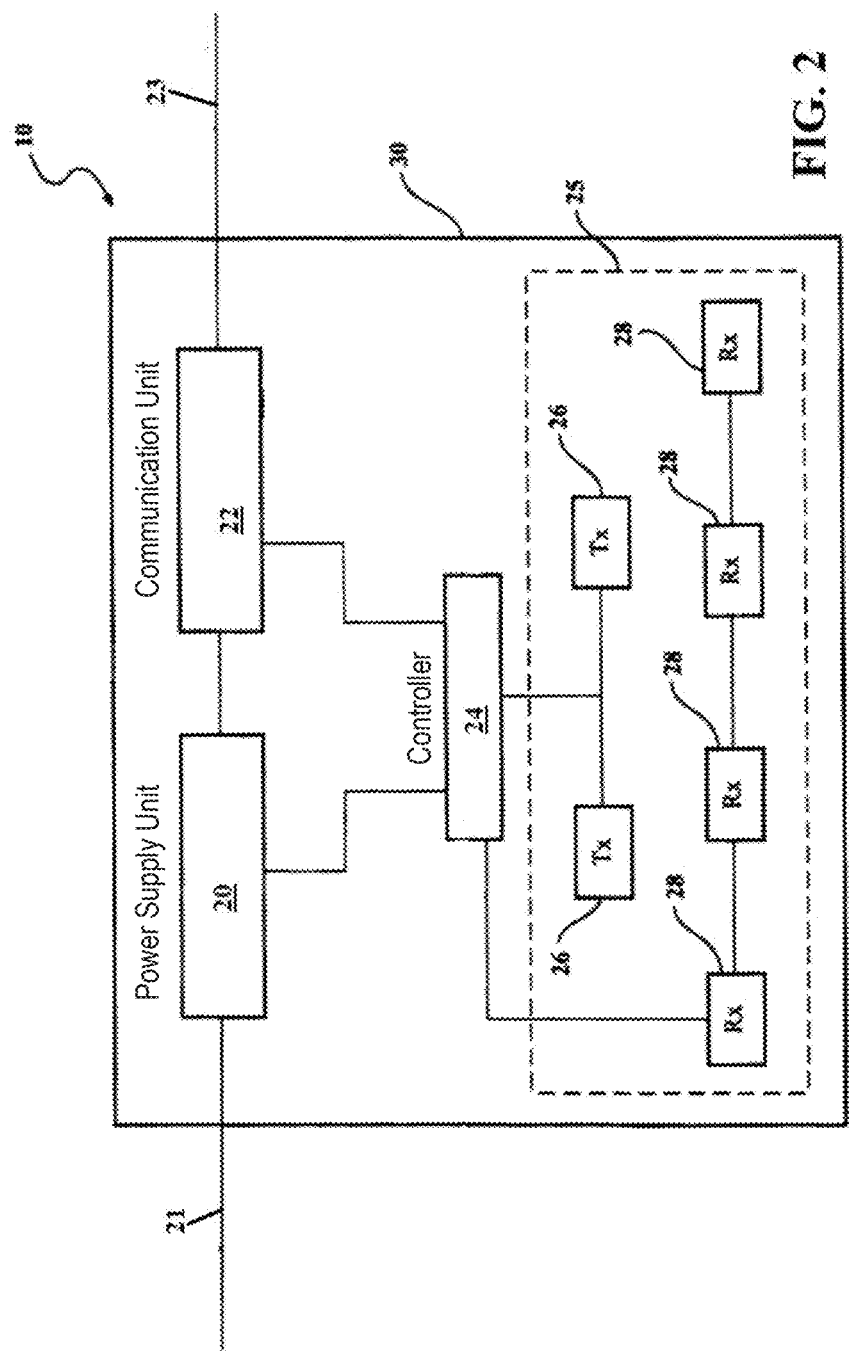

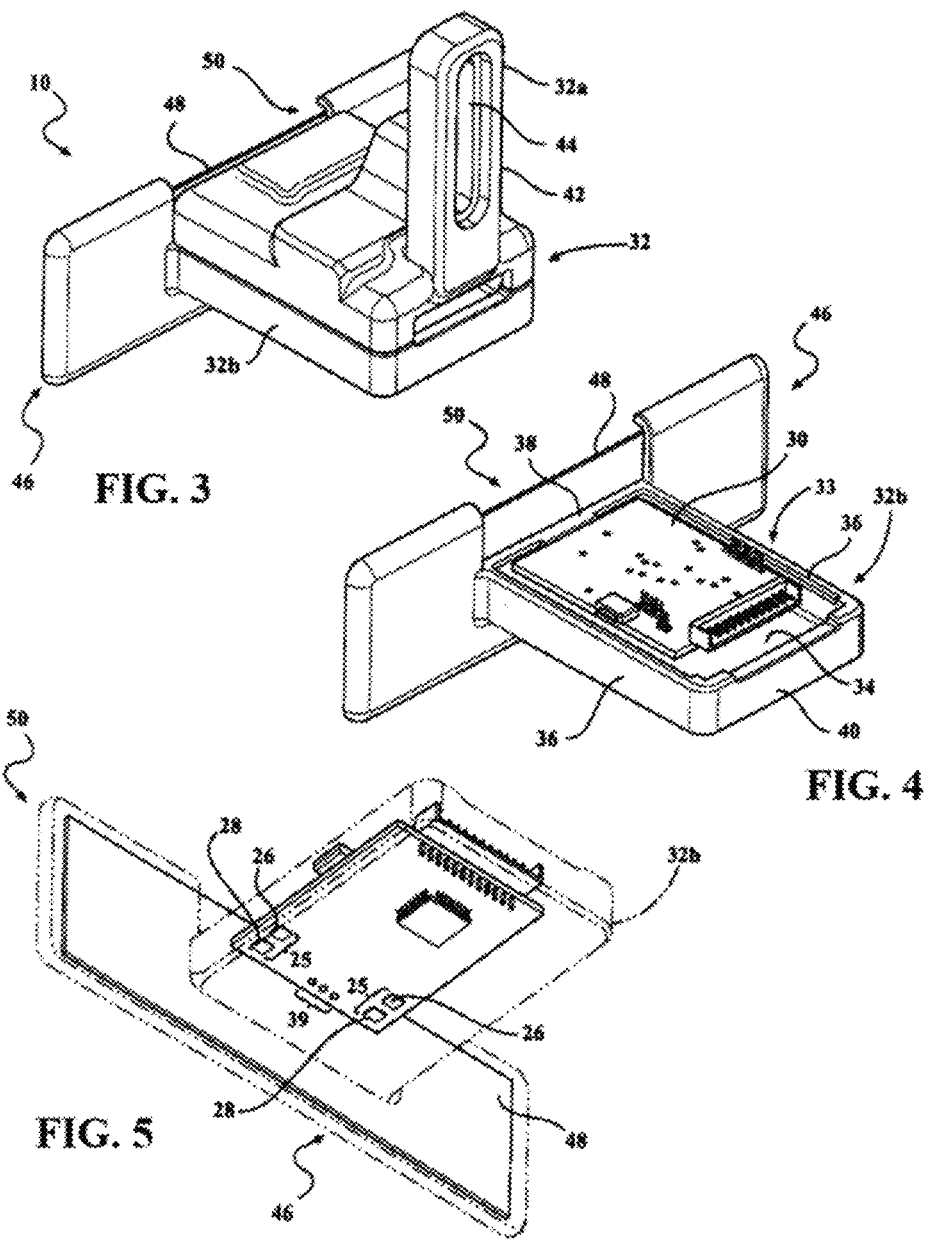

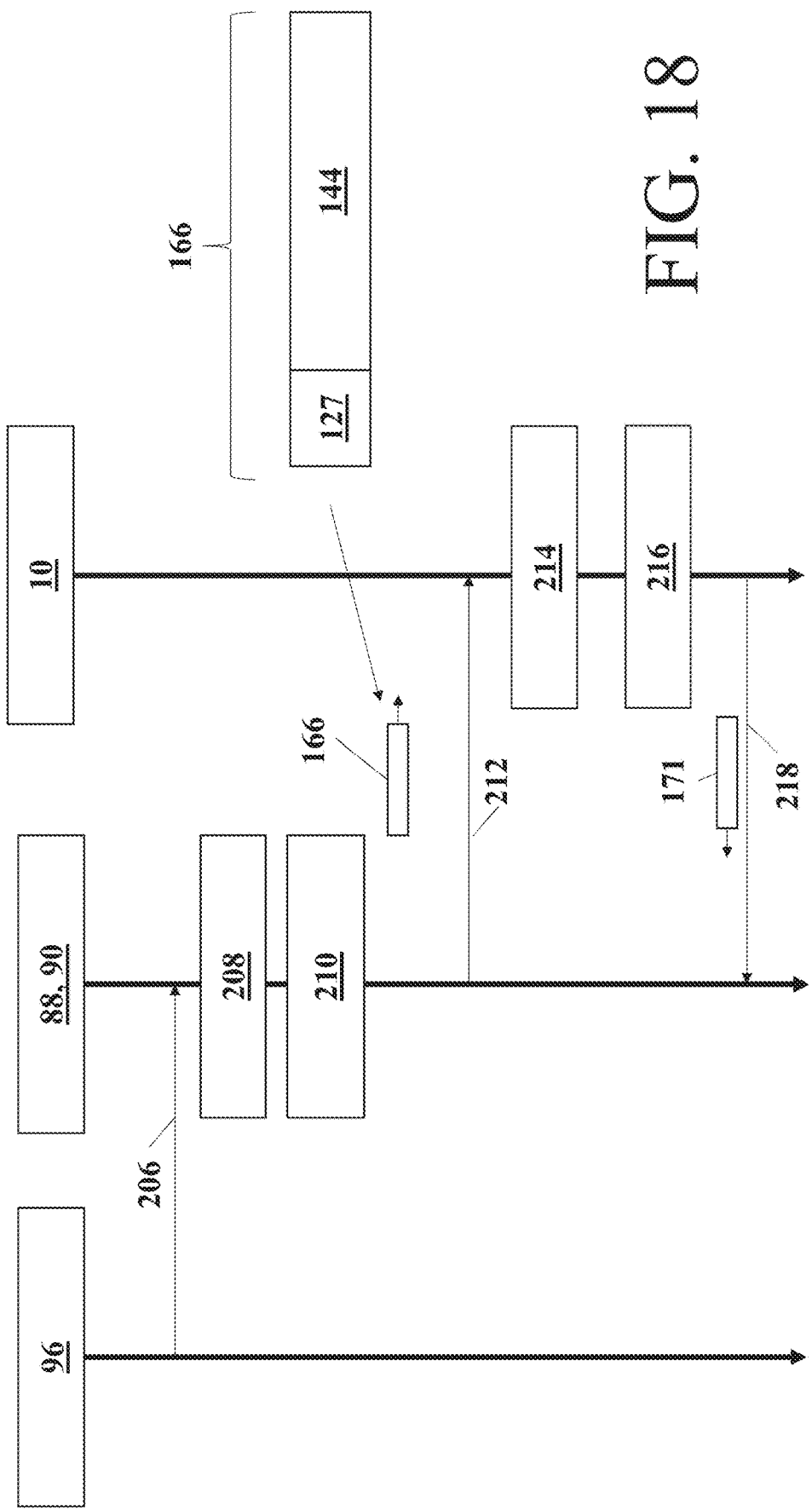

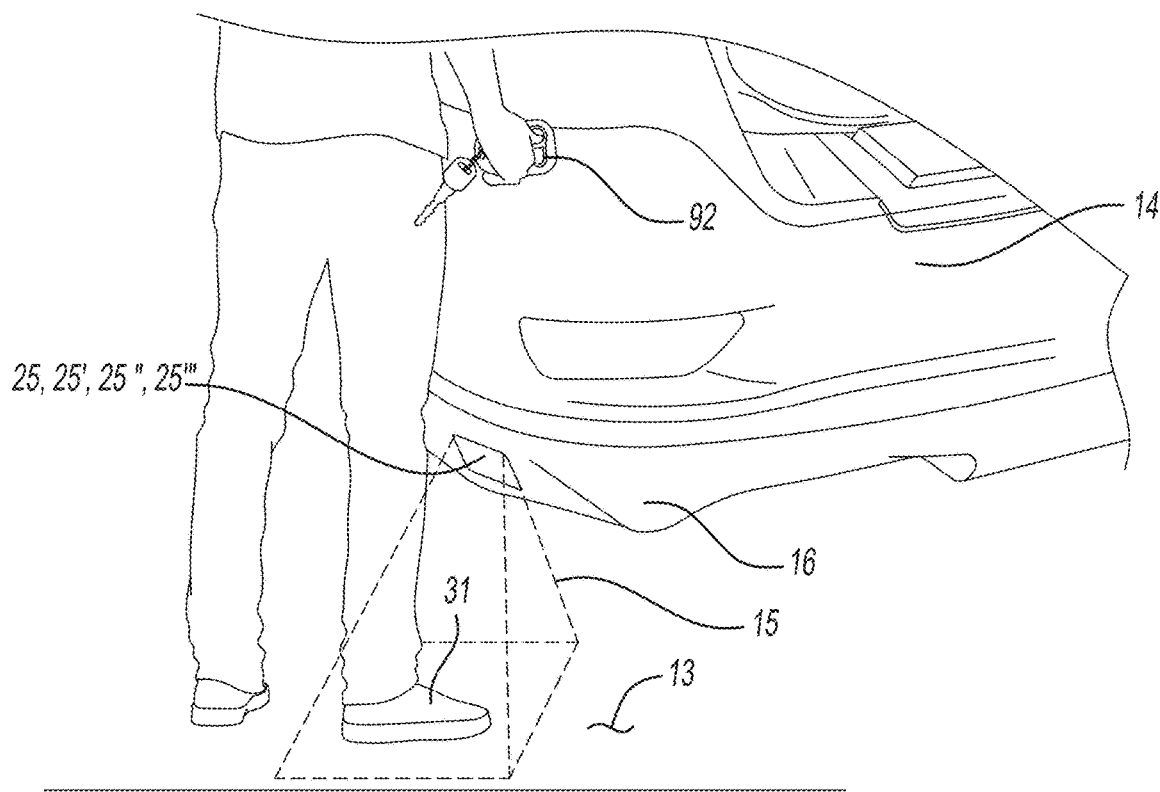
Fig-19A
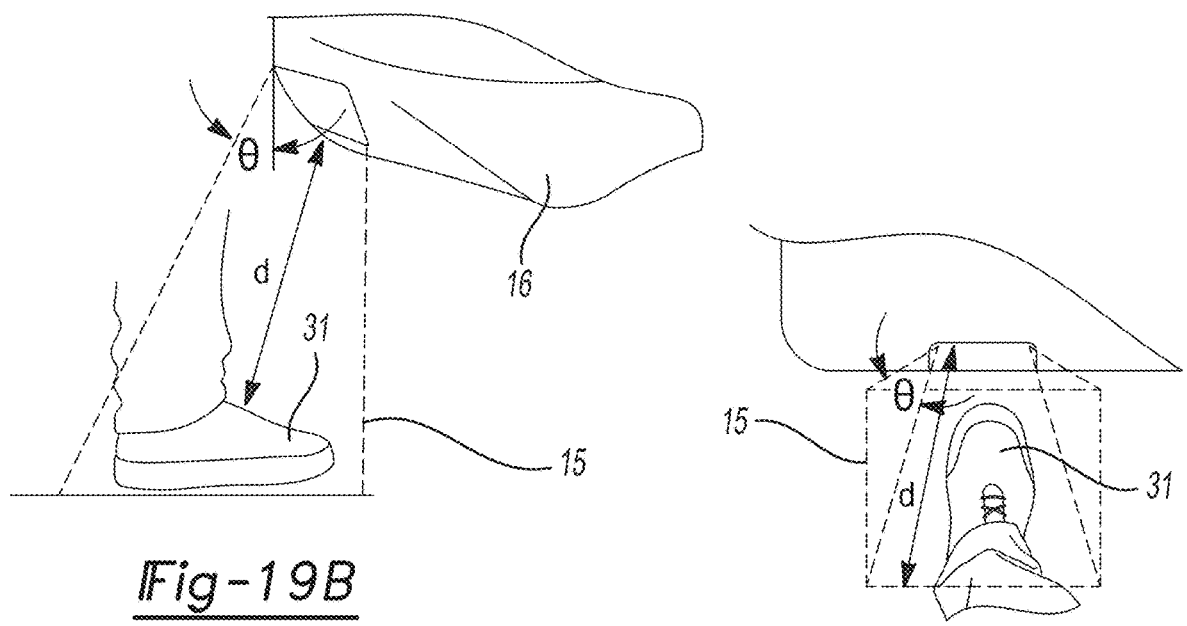
Fig-19B
Fig-19C

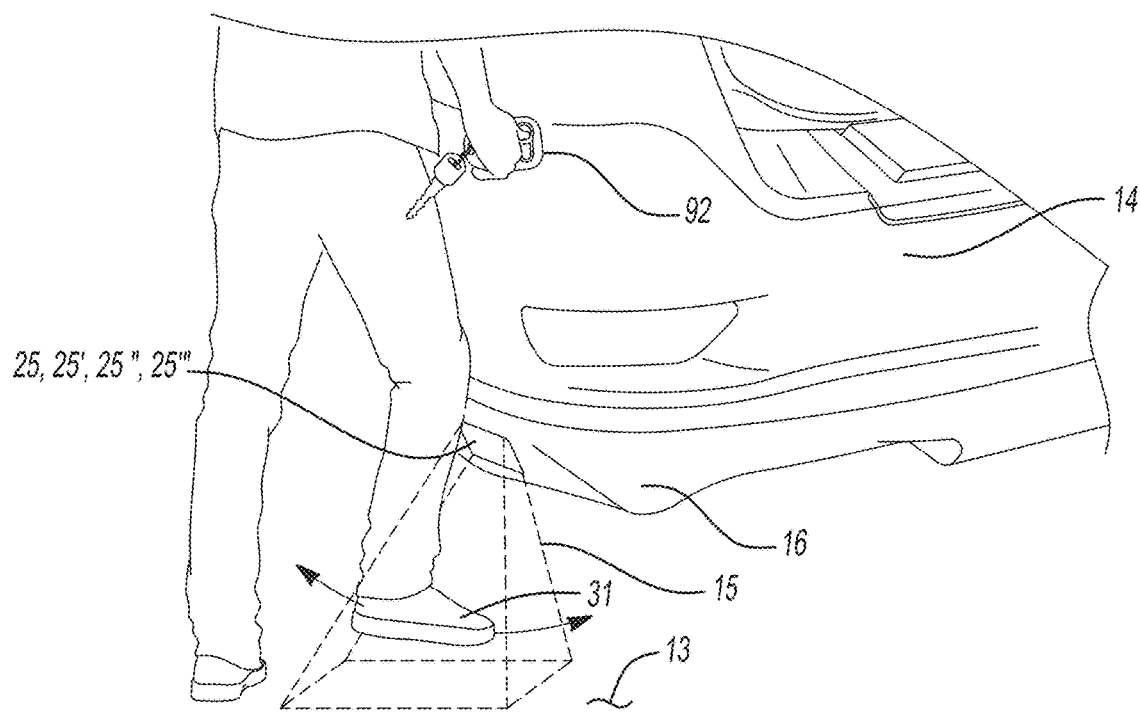
Fig-21A
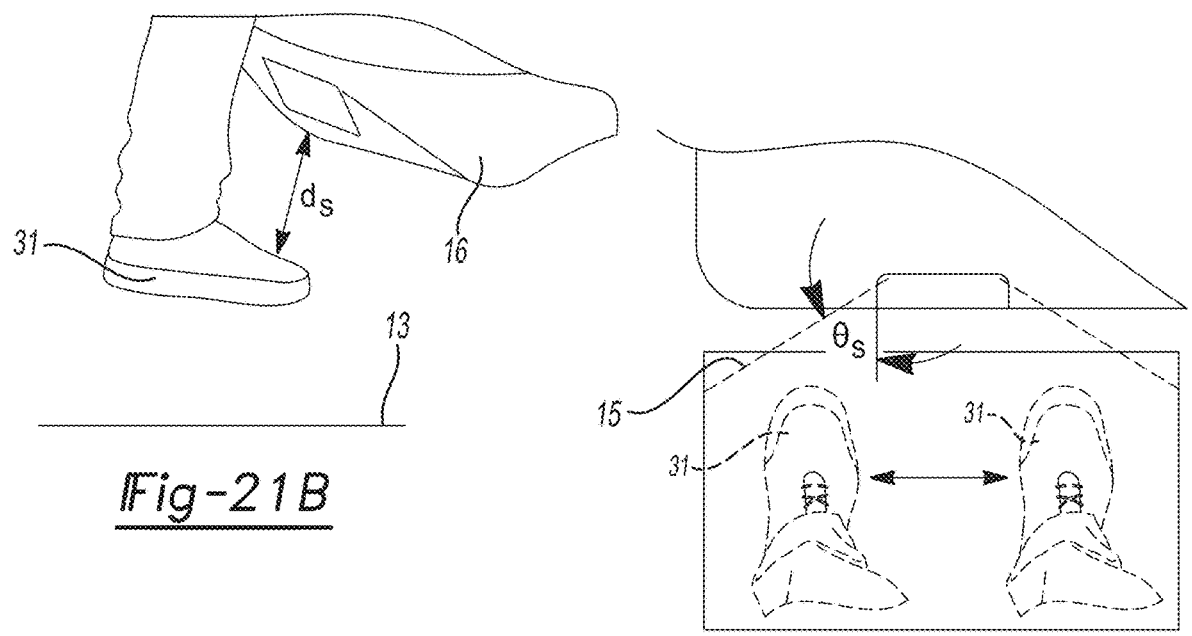
Fig-21B
Fig-21C

SELECTABLE GESTURE DETECTION SYSTEM AND METHODS

CROSS-REFERENCE TO RELATED APPLICATIONS APPLICATION

International Patent Application No. PCT/CA2020/050673, filed May 19, 2020, which claims the benefit of U.S. Provisional Application No. 62/854,675 filed May 30, 2019. The entire disclosure of the above application being considered part of the disclosure of this application and hereby incorporated by reference.

FIELD

The present disclosure relates generally to a detection system for a vehicle and, more particularly to a selectable gesture detection system for user-activated, non-contact activation of a powered closure panel.

BACKGROUND

This section provides background information related to the present disclosure which is not necessarily prior art.

Vehicles may be equipped with different sensor systems that perform different functions. For example, vehicles may be provided with a gesture activated system which can detect foot or hand movements for opening a closure panel (e.g., lift gate of the vehicle) based on the gesture made. With regard to closure panels (e.g. powered lift gates), and in particular to gesture activated systems therefor, the detection of a foot or hand gesture can be used to open such panels. This can be beneficial, particularly when a user's hands are occupied. However, it is desired to avoid unintended detections (false triggering), such as of a pedestrian walking nearby the user's vehicle, but not intending to trigger actuation of the closure panel. Additionally, users of the gesture activated systems may desire to modify or choose the gestures which can be used to open the closure panels.

Accordingly, there remains a need for improved detection systems used on vehicles that overcome these and other shortcomings of known detection systems.

SUMMARY

This section provides a general summary of the present disclosure and is not a comprehensive disclosure of its full scope or all of its features and advantages.

It is an object of the present disclosure to provide a detection system and methods of operating the detection system that address and overcome the above-noted shortcomings.

Accordingly, it is an aspect of the present disclosure to provide a detection system for user-activated, non-contact activation of a powered closure panel of a vehicle. The detection system includes a detection module including at least one sensor subassembly coupled to a vehicle body of the vehicle for detecting an object in a detection zone and sensing a motion and characteristics of the object in the detection zone and outputting a sensor signal corresponding to the motion and characteristics of the object in the detection zone. The detection system also includes a gesture selector for accepting a user input from a user to select a valid activation gesture. The detection system additionally includes a controller arrangement coupled to the at least one sensor subassembly and in communication with the gesture selector. The controller arrangement is configured to receive the user input from the gesture selector and adjust at least one of a plurality of predetermined thresholds representing the valid activation gesture by the user required to move the closure panel based on the user input. The controller arrangement is also configured to receive and analyze the sensor signal from the at least one sensor subassembly. The controller arrangement determines whether the sensor signal is within the plurality of predetermined thresholds and initiates movement of the closure panel in response to the sensor signal being within the plurality of predetermined thresholds representing the valid activation gesture.

In an aspect of the disclosure, the user interface is incorporated into an infotainment system within a cabin of the vehicle.

In an aspect of the disclosure, the body control module is selectively decoupled from the electronic controller of the detection module in response to the tool being selectively coupled to the body control module.

In an aspect of the disclosure, the tool is configured to set one of the plurality of gesture operation mode statuses of the body control module.

In an aspect of the disclosure, the electronic controller is configured to communicate the one of the plurality of gesture operation mode statuses to the body control module in response to the coupling of the electronic controller to the body control module and the body control module is configured to synchronize with the electronic controller and process the sensor signal from the at least one sensor subassembly using at least one of the plurality of preloaded detection algorithms.

In an aspect of the disclosure, the at least one sensor subassembly is a radar sensor subassembly including at least one radar transmit antenna for transmitting radar waves and at least one radar receive antenna for receiving the radar waves after reflection from the object in the detection zone to sense the motion and characteristics of the object in the detection zone and output the sensor signal corresponding to the motion and characteristics of the object in the detection zone.

In an aspect of the disclosure, the electronic controller is further configured to: detect a plurality of extracted features of the sensor signal, determine whether the plurality of extracted features are within the plurality of predetermined thresholds representing the valid activation gesture by the user required to move the closure panel, initiate movement of the closure panel in response to the plurality of extracted features being within the plurality of predetermined thresholds representing the valid activation gesture.

According to another aspect of the disclosure, a method of operating a detection system for user-activated, non-contact activation of a powered closure panel of the vehicle is also provided. The method includes the step of receiving a user input from a gesture selector using a controller arrangement in communication with the gesture selector. The method continues with the step of adjusting at least one of a plurality of predetermined thresholds representing a valid activation gesture by the user required to move a closure panel based on the user input from the gesture selector using the controller arrangement. The next step of the method is sensing a motion and characteristics of an object in a detection zone using at least one sensor subassembly coupled to the controller arrangement. The method proceeds by outputting a sensor signal corresponding to the motion and characteristics of the object in the detection zone using the at least one sensor subassembly. Next, receiving and analyzing the sensor signal from the at least one sensor subassembly using the controller arrangement. The method then includes the step of determining whether the sensor signal is within the plurality of predetermined thresholds using the controller arrangement. The method also includes the step of initiating movement of the closure panel in response to the sensor signal being within the plurality of predetermined thresholds representing the valid activation gesture using the controller arrangement is provided.

In an aspect of the disclosure, the method further includes the steps of assigning one of a plurality of gesture detection modes to a fob in communication with the controller arrangement; monitoring for an approach of the fob to the vehicle; operating a master vehicle node coupled to the user interface and operable with a plurality of gesture operation mode statuses and a plurality of preloaded detection algorithms corresponding to the one of the plurality of gesture detection modes assigned to the fob; and initiating movement of the closure panel in response to the sensor signal being within the plurality of predetermined thresholds representing the valid activation gesture associated with the one of the plurality of gesture detection modes assigned to the fob.

In an aspect of the disclosure, the valid activation gesture includes at least one of a stationary hold gesture and a side to side gesture with a predefined speed and predefined distance and predefined angle and a step-in gesture with a predefined speed and predefined approach distance and predefined break point and a gesture within a predetermined time period.

In an aspect of the disclosure, the gesture selector is a tool for selectively coupling to the body control module.

In an aspect of the disclosure, the method further includes the step of selectively decoupling the body control module from the electronic controller of the detection module in response to the tool being selectively coupled to the body control module.

According to yet another aspect of the disclosure, a method of configuring a detection system for operating a closure panel of a vehicle is provided. The method includes the step of detecting a request to modify to the gesture detection operating mode of the detection system. Next, configuring a controller arrangement configured to transmit a sensor signal transmitted over the vehicle network from the at least one sensor subassembly based on the detected request. The method also includes the step of configuring a controller arrangement configured to analyze a sensor signal transmitted over the vehicle network from the at least one sensor subassembly based on the detected request.

According to another aspect of the disclosure, a method of configuring a detection system for operating a closure panel of a vehicle is additionally provided. The method includes the step of connecting at least one sensor subassembly to a vehicle network, the at least one sensor subassembly configured in an operating mode to detect one of a plurality of gesture types. The next step of the method is configuring a controller arrangement configured to receive a sensor signal transmitted over the vehicle network from the at least one sensor subassembly to analyze the sensor signal based on the operating mode of the at least one sensor subassembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a schematic diagram of the detection module of FIG. 1 according to aspects of the disclosure;

FIG. 3 is a rear perspective view of the detection module of FIG. 1 according to aspects of the disclosure;

FIG. 4 is a view similar to FIG. 3 with a top cover removed therefrom according to aspects of the disclosure;

FIG. 5 is a front perspective view of the detection module of FIG. 1 according to aspects of the disclosure;

FIG. 18 is a sequential diagram of a gesture detection system illustrating the exchange of communications over a vehicle bus for modifying a gesture detection mode of a gesture detection system in accordance with an illustrative embodiment;

FIGS. 19A-19E illustrate one of a plurality of gesture detection modes of the controller arrangement according to aspects of the disclosure;

FIGS. 21A-21E illustrate another of the plurality of gesture detection modes of the controller arrangement according to aspects of the disclosure;

DETAILED DESCRIPTION

In the following description, details are set forth to provide an understanding of the present disclosure. In some instances, certain circuits, structures and techniques have not been described or shown in detail in order not to obscure the disclosure.

In general, the present disclosure relates to a detection system of the type well-suited for use in many applications. The detection system and associated methods of operation of this disclosure will be described in conjunction with one or more example embodiments. However, the specific example embodiments disclosed are merely provided to describe the inventive concepts, features, advantages and objectives with sufficient clarity to permit those skilled in this art to understand and practice the disclosure. Specifically, the example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
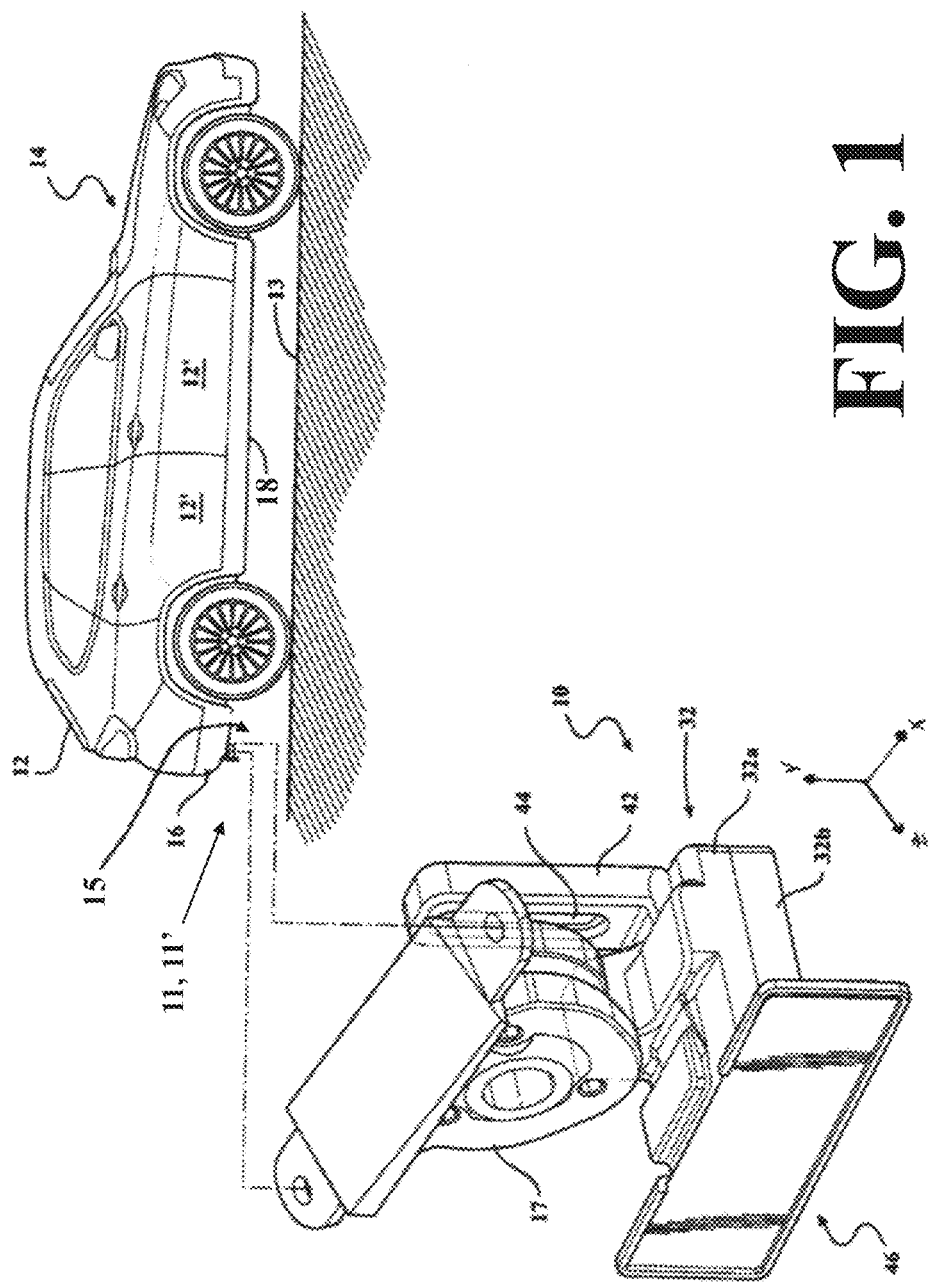
FIG. 1 is an exploded view illustrating a detection module of a detection system mounted on a rear bumper of a vehicle according to aspects of the disclosure.

Referring to the Figures, wherein like numerals indicate corresponding parts throughout the several views, FIG. 1 illustrates a detection module 10 of a detection system 11, 11' for a powered closure panel 12, 12', such as a lift gate 12 and/or door 12' of a vehicle 14. The detection module 10 may be provided as an integral component of an existing vehicle component or fixed as a separate component to a frame member or other feature of the vehicle 14, which can be naturally positioned at a desired location and orientation relative to the closure panel 12, 12' to take advantage of the detection pattern and range (i.e., approximately 5 m using radar). It is to be recognized that a single detection module 10 can be used for multiple closure panels 12, 12', by way of example and without limitation; however, using more than one detection module 10 to obtain a desired detection pattern or detection zone 15 is also contemplated herein. The closure panels 12, 12' can include a lift gate 12 and/or a door 12'; however, the detection module 10 and detection system 11, 11' may be used with other closure panels besides lift gate 12 and door 12'.

In more detail, for the lift gate 12, the detection module 10 can be disposed on, behind or adjacent a rear bumper 16. For the door 12', the detection module 10 can be disposed on, behind or adjacent a side beam (door sill) 18, shown as being beneath the door sill 18. It is to be further recognized that the detection module(s) 10 can be adapted to be disposed in any desired location of the vehicle 14 to provide the desired detection pattern for the intended application. To facilitate positioning the detection module 10 in a precise orientation to provide a precisely located radar detection pattern, the detection module 10 can be fixed to pivotal member, shown in FIG. 1 as a spherical bearing member 17, sometimes referred to as bearing pillow block, by way of example and without limitation, thereby allowing the detection module 10 to be pivoted about multiple X, Y, and/or Z axes and fixed in the desired position. Optionally, an actuator and rotatable assembly (both not shown) may be provided so as to adaptively rotate the module 10 to vary the detection zone 15 (e.g., vary the radar pattern) based on the mode of operation of the module 10, or the terrain surrounding the vehicle 14.

As best shown schematically in FIG. 2, the detection module can include a power supply unit 20 for coupling a power supply 21 of the vehicle 14 to provide power to the detection module 10. Additionally, the detection module can include a communication unit 22 electrically coupled to the power supply unit 20 for communicating with the plurality of vehicle system controllers, such as a body control module (BCM), discussed in more detail below over a communication bus 23. Further yet, the detection module 10 can include a microprocessor or electronic controller 24 electrically coupled to the power supply unit 20 and communication unit 22 as well as to at least one sensor subassembly (discussed below), all of which can be disposed on a sensor printed circuit board (PCB) as an integral, modular sub-assembly.

The detection module 10 includes the at least one sensor subassembly 25 (e.g., a radar emitting sensor) for detecting an object 31 (e.g., the user or user's foot) in the detection zone 15 and sensing a motion and characteristics of the object 31 in the detection zone 15 (e.g., adjacent the closure panel 12, 12'). The at least one sensor subassembly 25 outputs a sensor signal corresponding to the motion and characteristics of the object 31 in the detection zone 15. Specifically, the at least one sensor subassembly 25 can include at least one radar transmit antenna 26 for transmitting a plurality of radar beams outwardly therefrom and at least one radar receive antenna 28 for receiving signals from the plurality of radar beams emitted from the radar transmit antennas 26 subsequent to being reflected from the object 31, for example. While the at least one sensor subassembly 25 is discussed as utilizing radar, it should be appreciated that other types of the at least one sensor subassembly 25 (e.g., infrared) may be utilized in addition to or instead.

The at least one radar transmit antenna 26 and the at least one radar receive antenna 28 can be provided to operate at about 80 gigahertz, by way of example and without limitation. However, it is to be recognized that the at least one radar transmit antenna 26 the at least one radar receive antenna 28 may operate at other frequencies, as desired for the intended application.

The electronic controller 24 can be configured to be operable in a plurality of gesture type detection modes and is electrically coupled to the power supply unit 20 and the antennas 26, 28 of sensor subassembly 25 and the communication unit 22 for operable communication therewith. In general, the use of radar (providing resolution, range, and material penetrating properties) properly positioned for coverage of a desired volume about the desired closure panel 12, 12' can perform the one or more detection functions, including gesture recognition and object detection. Additionally, the resolution provided by radar can provide increased resolution needed for gesture recognition (such as a passing foot, hand, and even facial gesture detection) at various ranges, for example, at foot level near the bumper 16 or about ground level 13, but also at distances away from lift gate 12 and/or door 12', if desired. Thus, the detection module 10 may operate as part of a park assist process and an outward obstacle detection process and an inward obstacle detection process.

The gesture recognition of the detection module 10 may be used to detect a valid activation gesture for opening activation of lift gate 12 (e.g., detection of a foot, a hand, or a face gesture). Accordingly, if the lift gate 12 is closed and the vehicle 14 is in park, the detection module 10 can await a user to command opening of the lift gate 12 via the valid activation gesture. The position of the detection module 10 is configured and located to cover the area about the periphery of the vehicle 14, illustratively about an area able to detect foot or leg gestures or motions, or the height of a human for other gesture recognition, and the resolution of the radar-based antennas 26, 28 can provide for detection of precise gestures for controlling intended activation of the closure panel 12, 12'. The detection module 10 can initiate or command operation of the closure panel 12, 12' (e.g., open) by activating a closure actuator/motor subsequent to a positive activation/access gesture (e.g., a foot motion, foot rotation, step-in, step-out, a foot or hand swipe, a hold, or the like). For example when operating in the outward obstacle detection process, the detection module 10 can command operation of the closure panel 12, 12' (e.g., open) by deactivating or stopping a closure actuator/motor, or alternatively, for establishing the environment about the vehicle 14 for baselining the detection zone of the detection module 10, e.g., to vary the detection zone 15 based on a curb, snow pile, irregularities in the terrain about the vehicle 14 and the like. For example when operating as part of the inward obstacle detection process, the detection module 10 can command operation of the closure panel 12, 12' (e.g., open) by deactivating or stopping a closure actuator/motor.

The electronic controller 24 can be configured to determine which of the one or more modes or processes should be active based on communication with one or more vehicle system controllers (e.g., body control module). The electronic controller 24 is configured to execute software code and/or instructions stored on a memory unit (not shown), such as an EEPROM or other type or memory device such as a solid state disk, RAM, hard disk or the like.

In addition, the electronic controller 24 can be configured to receive and process the sensor signal corresponding to the motion and characteristics of the object 31 from the at least one sensor subassembly 25 based on the determination of which of the plurality of modes should be active. Additionally, the electronic controller 24 can be configured to initiate movement of the closure panel 12 in response to processing the sensor signal corresponding to the motion and characteristics of the object 31 (gesture recognition). More specifically, if the at least one sensor subassembly 25 is a radar sensor subassembly, as described above, the electronic controller 24 can further be configured to detect a plurality of extracted features of the sensor signal determine whether the plurality of extracted features are within the plurality of predetermined thresholds representing the valid activation gesture by the user required to move the closure panel 12, 12'. The electronic controller 24 can then initiate movement of the closure panel 12, 12' in response to the plurality of extracted features being within the plurality of predetermined thresholds representing the valid activation gesture.

Additionally, the detection module 10 can include a housing 32, shown by way of example in a non-limiting aspect has including an upper housing member 32a and a lower housing member 32b. At least a portion of the housing 32 permits the radar beam to pass therethrough, and in accordance with the one aspect, a portion of the housing 32 can be provided as being transparent to the passage of the radar beam. In the non-limiting embodiment illustrated in FIGS. 3-5, the lower housing member 32b is constructed of a radiolucent or transparent plastic for the passage of radio waves therethrough. The lower housing member 32b further includes a receptacle 33 configured for receipt of the PCB 30 therein, with the receptacle 33 shown, by way of example and without limitation, as being delimited by a floor 34 and upstanding sidewalls 36 extending between an upstanding front wall 38 and an upstanding rear wall 40. It is contemplated herein that an opening could be formed in the housing 32, such as in the lower housing member 32b, and a lens cover could be coupled to the lower housing member 32b to extend over the printed circuit board 30 for covering the opening and allowing light from a plurality of light emitting diodes 39 forming part of an optional lighting subassembly integral with printed circuit board 30, or separate therefrom, to shine outwardly from the detection module 10, if desired, and optionally illuminate on the ground 13 the corresponding detection zone 15 to the user to visually inform the user the precise location of the detection zone 15.

The upper housing member 32a is formed to extend over and enclose the receptacle 33 of lower housing member 32b to protect the PCB 30 and components thereon against damage and exposure to environmental elements. The upper housing member 32a can be shaped and otherwise configured as desired, as can the lower housing member 32b. Further, the upper and/or lower housing member 32a, 32b can be configured having attachment features, with the upper housing member 32a being shown, by way of example and without limitation, as having such an attachment feature in the form of an upstanding arm or boss 42. The boss 42 has a through opening, shown as an elongate through slot 44, to facilitate attachment of the detection module 10 to the vehicle 14, such as via the pivotal spherical bearing member 17, which in turn is configured to be fixed to the desired location on the vehicle 14. The elongate slot 44 allows for adjustment up-and-down, vertically along a Y axis, while the spherical bearing member 17 allows for pivotal movement about X, Y, Z axes (FIG. 1), as will be understood by the skilled artisan.

The housing 32, and shown as the lower housing member 32b, by way of example and without limitation, further includes a radar shield portion 46 extending upwardly (e.g., vertically), shown as in transverse or substantially transverse relation to the floor 34 along the front wall 38, by way of example and without limitation. Radar shield 46 is shown only in the context of one possible configuration and may not be provided. The radar shield portion 46 is radiopaque, thereby preventing the passage of radio waves therethrough. Radar shield portion 46 may be configured to reflect or absorb the plurality of radar beams RB that impinge upon the radar shield portion 46. In accordance with one non-limiting aspect, the radar shield portion 46 of lower housing member 32b can be formed to carry a radiopaque member 48, such as a metal plate or some other material that acts as a barrier to the passage of radio waves therethrough. The metal plate 48 is shown disposed and fixed within a receptacle 50 formed as a single piece of plastic material with the lower housing member 32b, such as in a molding process, by way of example and without limitation, though the metal plate 48 could be otherwise fixed to the upper housing member 32a in addition to or in lieu of being fixed to lower housing member 32b, as will be recognized by a skilled artisan. The metal plate 48 is shown as extending transversely to the floor 34 of the lower housing member 32b, (and thereby illustratively extending transversely to the plane of the sensor printed circuit board 30 (PCB)), and thus, the metal plate 48 extends in transverse or substantially transverse (meaning it can be slightly more or less, such as by about 10 degrees, for example) relation to the ground surface 13 on which the vehicle 14 travels. In another embodiment, an actuator and rotatable/pivotable assembly, such as a drive gear or member configured in driving relation with a turntable-like support platform or otherwise (both not shown), may be provided so as to adaptively rotate and/or pivot metal plate 48 relative to the housing (with the housing 32 being non-rotatable relative to the vehicle 14) to selectively vary and alter the size, shape and/or location of the detection zone 15 (e.g., vary the radar pattern) based on the mode of operation of the detection module 10, or the terrain surrounding the vehicle 14. For example, when the detection module 10 is operating in an obstacle detection mode, it may detect that the vehicle 14 has been parked next to an elevated curb, or next to a pile of snow, which may prevent a user from placing their foot in the detection zone normally associated with a flat surface/ground plane 13, and thus, not being able to activate the detection system 11, 11' absent adjustment thereof. Accordingly, the detection module 10 may adaptively vary the detection zone 15 (e.g., by rotating, pivoting, raising or lowering the detection module 10 and/or the radar shield portion 46) to compensate for loss of access to detection zone 15 due to obstacle, terrain, curb, or the like.

With the radar shield portion 46 located in front of the respective radar transmit and receive antennas 26, 28 for alignment with at least a portion of the path of radar beam emitted and received thereby, at least a portion of the radio waves of radar beam being emitted are blocked or absorbed (recognizing that a radio frequency absorptive material or coating could be applied to the radar shield portion 46 in combination with or in lieu of the metal plate 48), and thus, less than the entirety of the radio waves of radar beam being emitted pass beyond the radar shield portion 46. Accordingly, the radar shield portion 46 can be located, shaped and contoured as desired to provide a predetermined radar pattern formed by radar beam beyond the radar shield portion 46, thereby establishing a precisely patterned and shaped 3-D detection zone.

Figure 6:
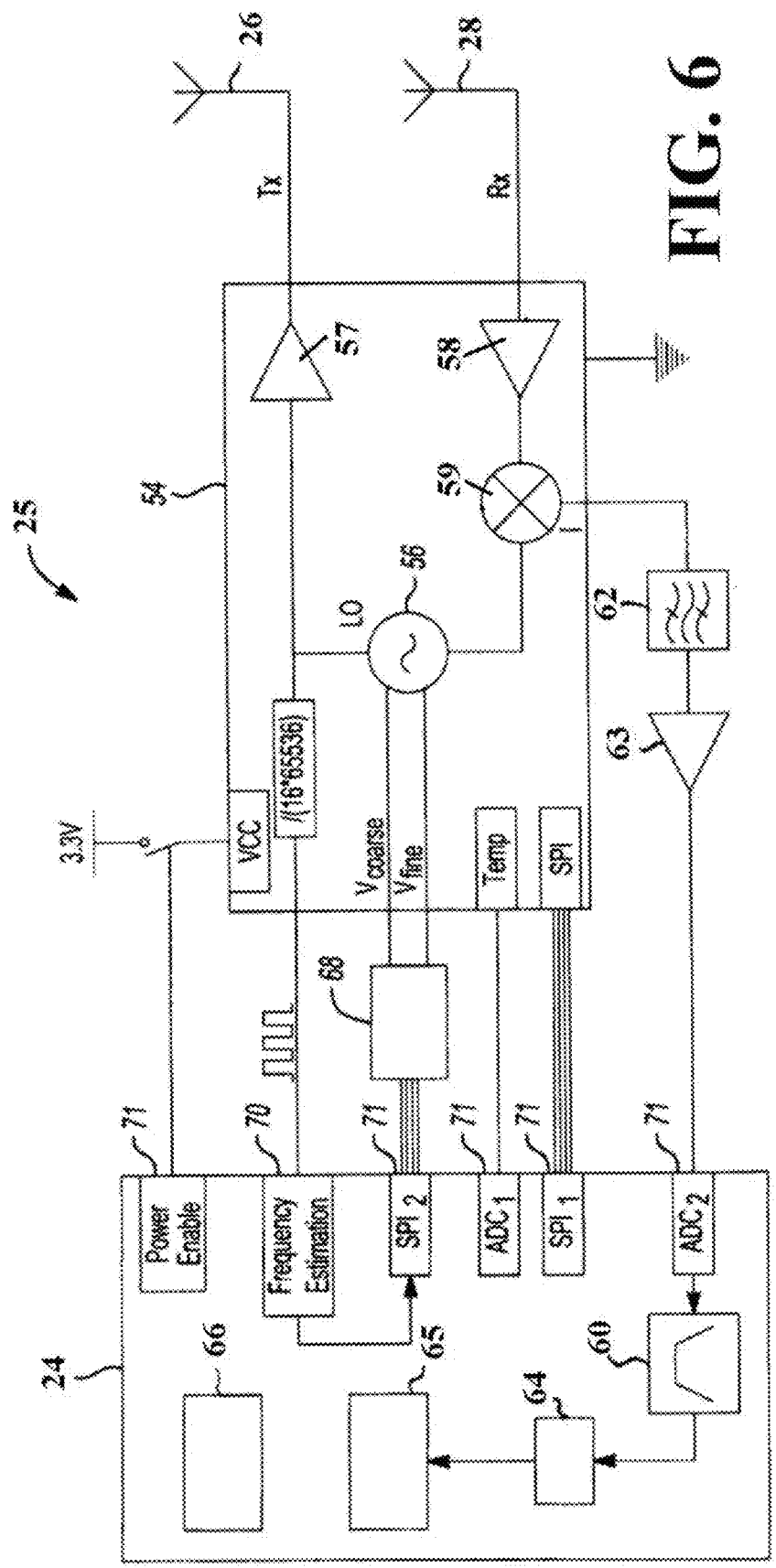
FIG. 6 is block diagram of the detection module of the detection system including a radar transceiver coupled to a controller arrangement according to aspects of the disclosure.

As best shown in FIG. 6, the at least one sensor subassembly can include a radar transceiver 54 (e.g., Infineon® BGT24MTR11) including a local oscillator 56 coupled to the at least one radar transmit antenna 26 through a transmit amplifier 57 for transmitting radar waves. The local oscillator 56 is also coupled to the at least one radar receive antenna 28 through a receive amplifier 58 and an internal mixer 59 for receiving the radar waves after reflection from the object 31 in the detection zone 15. Consequently, the at least one sensor subassembly 25 is coupled to the vehicle body 16 for sensing the motion and characteristics (e.g., speed, angle, intensity) of the object 31 in the detection zone and outputting the sensor signal corresponding to the motion of the object 31 in the detection zone 15. The electronic controller 24 or processor is coupled to (or part of) the at least one sensor subassembly 25 (e.g., mounted to the printed circuit board 30). Electronic controller 24 may also include dedicated signal processing hardware circuitry for processing signals, and may include software as executed by the electronic controller 24 for replicating such dedicated hardware, and may include a combination of hardware and software components. Such components (e.g., software) can include a filter module 60 of the electronic controller 24 coupled to the internal mixer 59 of the radar transceiver 54 through an external bandpass filter 62 and an external amplifier 63 for filtering the radar waves that are received. The components can also include a fast Fourier transform (FFT) module 64 coupled to the filter module 60 for performing a Fourier transform of the radar waves amplified and filtered by the external bandpass filter 62, external amplifier 63 and filter module 60 (i.e., transform from a time domain into a frequency domain). The components can also include a gesture algorithm 65 for recognizing the gesture sequence as described herein and a hardware initialization module 66 for initializing the system 11, 11'. An external digital to analog converter 68 may also be utilized between the electronic controller 24 and the at least one radar sensor subassembly 25 for converting control signals from the electronic controller 24 to the local oscillator 56 (e.g., $V_{coarse}$ and $V_{fine}$). The electronic controller 24 can also include a frequency estimator 70 to estimate a frequency of the radar waves being transmitted by the at least one radar transmit antenna 26 and a plurality of input-output ports 71.

Figure 7:
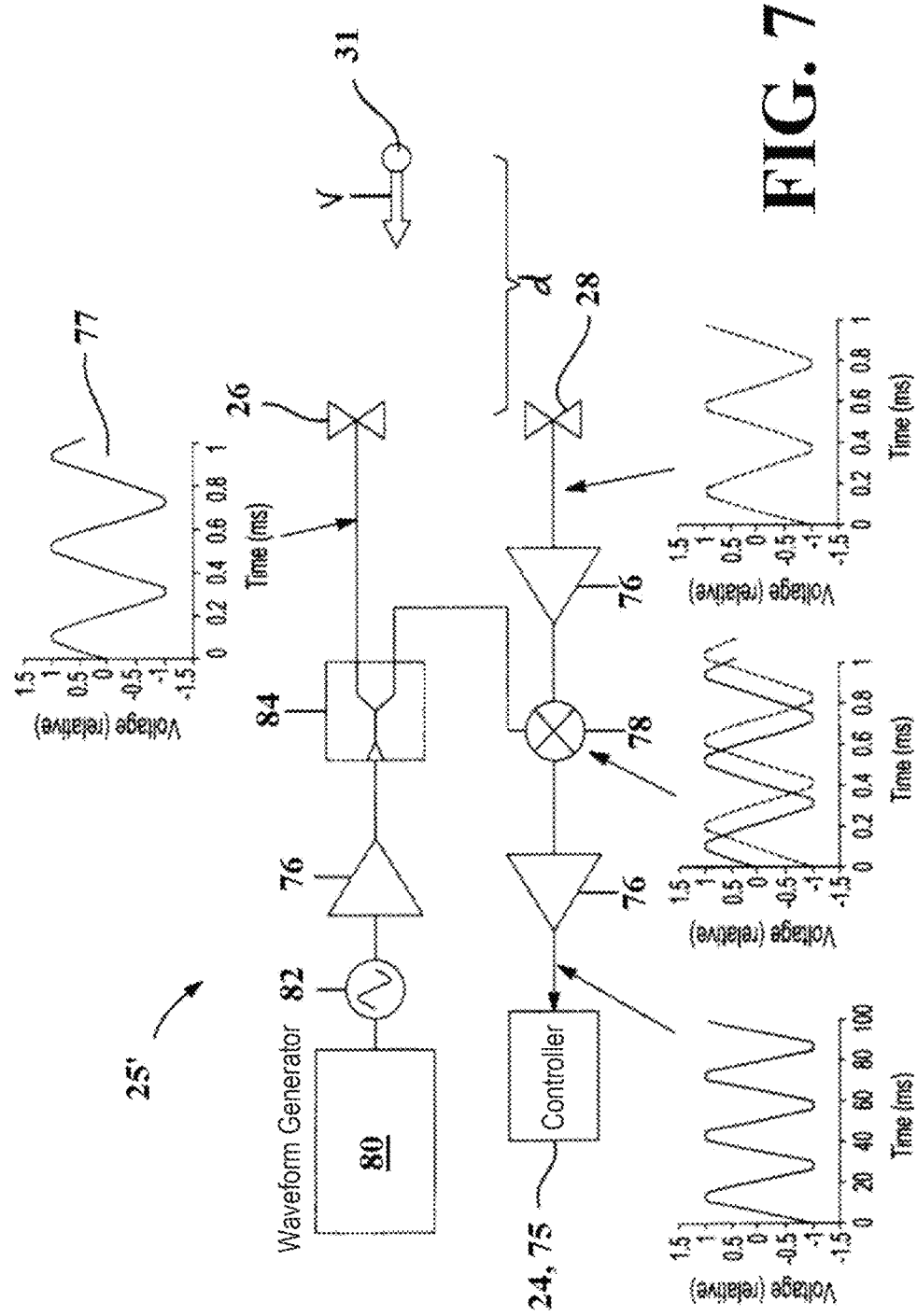
FIG. 7 is a schematic diagram of a continuous wave Doppler based sensor subassembly according to aspects of the disclosure.
Figure 8:
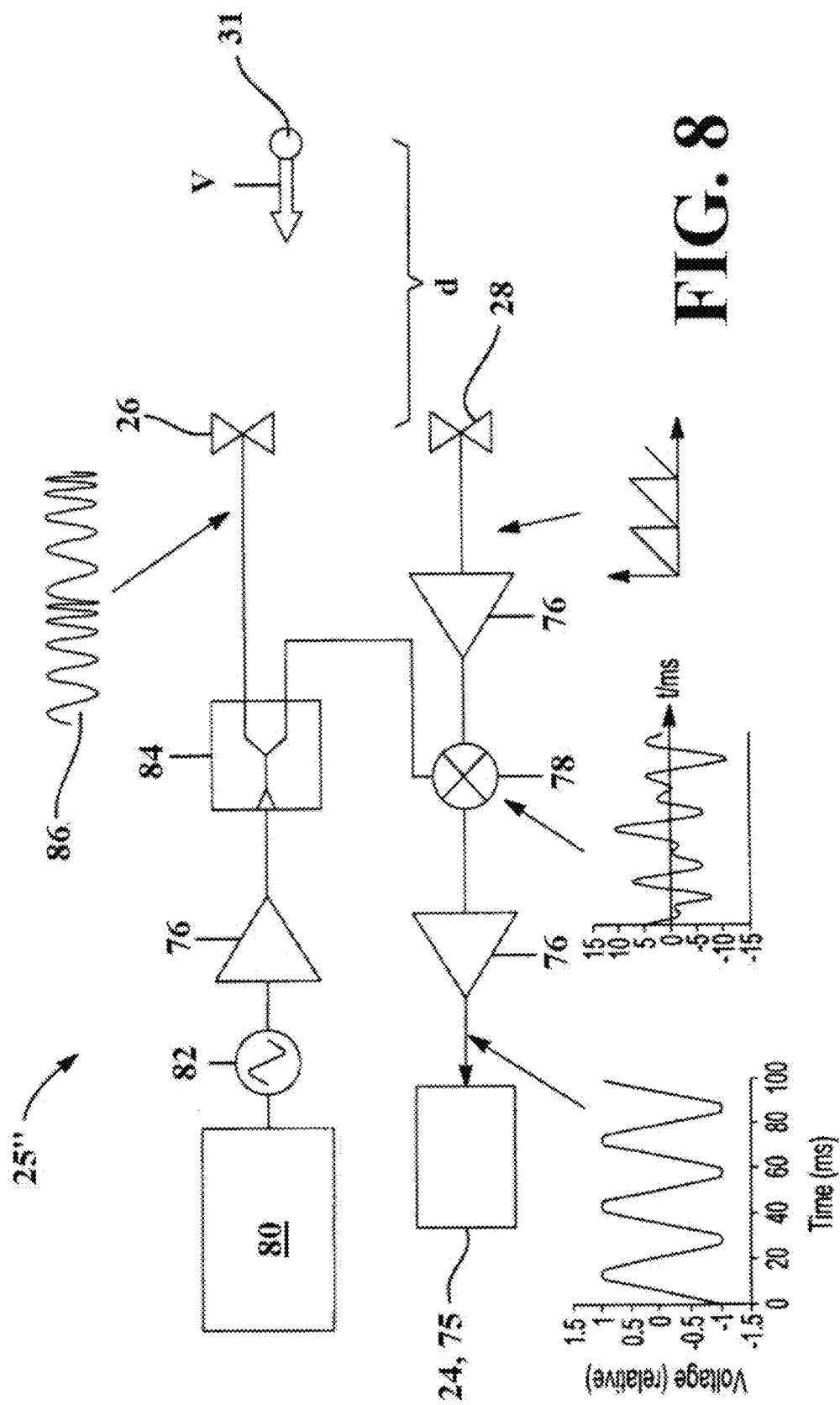
FIG. 8 is a schematic diagram of a continuous wave frequency modulated radar based sensor subassembly according to aspects of the disclosure.
Figure 9:
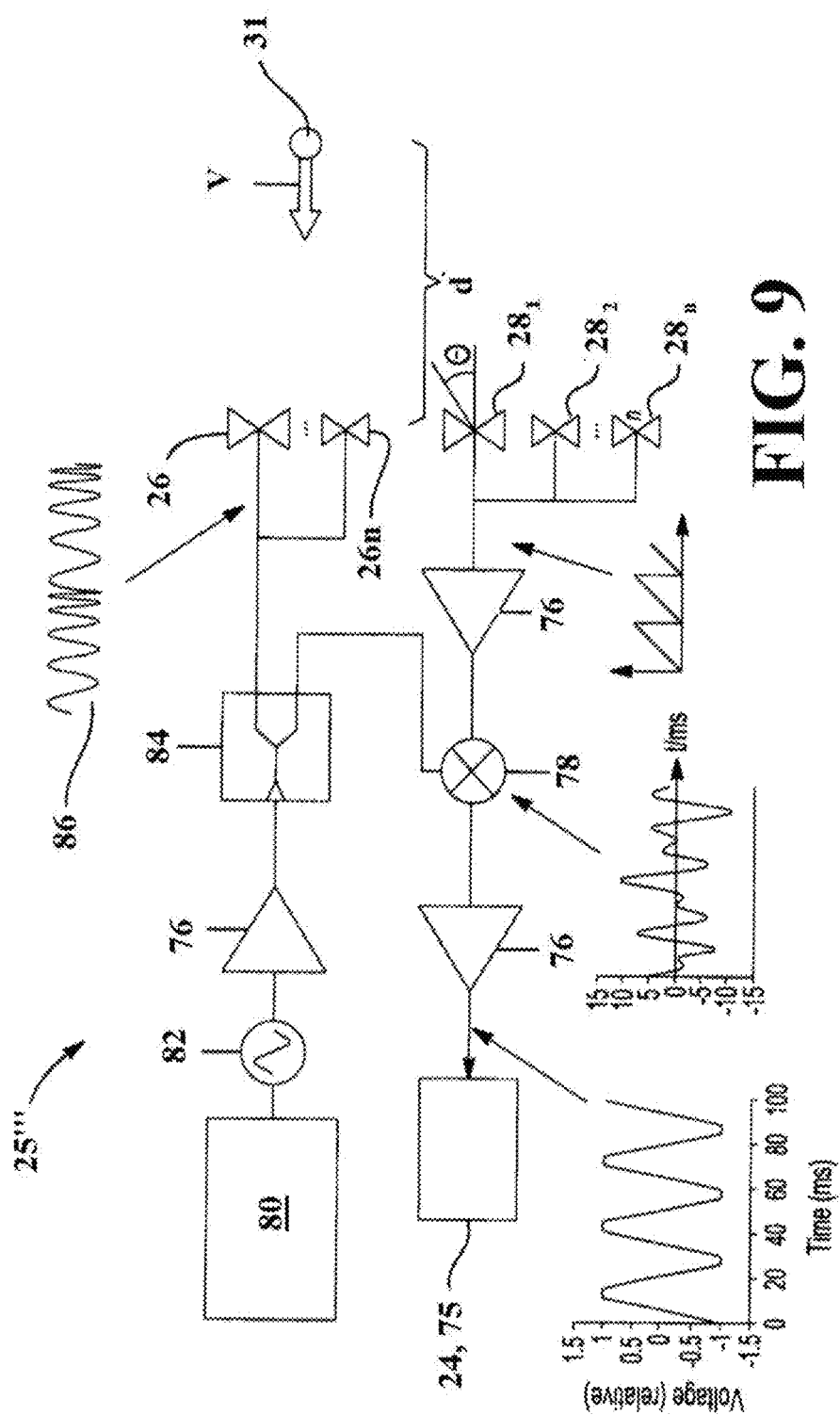
FIG. 9 is a schematic diagram of a continuous wave frequency modulated radar based sensor subassembly according to aspects of the disclosure.

According to an aspect, the at least one radar transmit antenna 26 and/or the at least one radar receive antenna 28 can be configured to emit continuously modulated radiation, ultra-wideband radiation, or sub-millimeter-frequency radiation (e.g. frequencies forming part of the ISM frequency band about 24 GHz). For example, the at least one radar transmit antenna 26 can be configured to emit continuous wave (CW) radar, known in the art to use Doppler radar techniques, employed as part of the at least one sensor subassembly 25, 25', 25", 25''' as illustrated in FIG. 7. For example, the at least one radar transmit antenna 26 can be configured to emit modulated radiation, or frequency modulated continuous wave (FMCW) radar, also known in the art to use Doppler radar, employed as part of the at least one sensor subassembly 25' as illustrated in FIGS. 8 and 9. Also, the at least one sensor subassembly 25' may be configured for pulsed time-of-flight radar. The at least one radar receive antenna 28 receives the reflections of such emitted waves, or senses the interactions within the intermediate radar field or detection zone 15 by the object 31 or user.

Referring to FIG. 7 in more detail, there is illustratively shown the at least one sensor subassembly 25' employing rapid low resolution Doppler radar. The at least one sensor subassembly 25' can be configured to emit and detect continuous wave (CW) radar, as is illustratively shown with the at least one sensor subassembly 25' including one transmit antenna 26 and one receive antenna 28, for providing a lower cost and simpler motion/object detection system. With such a configuration, the at least one sensor subassembly 25' is operable to detect a speed/velocity v of the object 31 using the Doppler Radar principles (i.e., processing by a signal processor, such as the electronic controller 24 or a dedicated local application-specific radar signal processor 75, of the received reflected CW radar signal to determine frequency shifts of an emitted continuous wave 77 indicative of the speed v of the object 31). In another embodiment, the at least one sensor subassembly 25' is configured to only detect the speed/velocity v of the object 31. The rapid, low resolution Doppler radar based sensor embodiment allows for the extraction of features characterizing the motion of the foot or object 31, such as speed/velocity v of the object 31, in a less processing and power consumption embodiment for controlling the closure panel 12, 12'. According to an aspect, the at least one sensor subassembly 25' employs one transmit antenna 26 for transmitting the radar signal, and one receive antenna 28 for receiving the reflected radar signal. In accordance with another rapid, low resolution Doppler radar based sensor embodiment, the at least one sensor subassembly 25' may be configured to extract features from the received reflected electromagnetic signal characterizing the motion of the foot or object 31 including only the speed or velocity v of the object 31, and the reflectivity/size of the object 31. The received reflected electromagnetic signal may be analyzed from which frequency (indicative of speed or velocity v of the object 31) and amplitude (indicative of reflectivity and size of the object 31) signal components can be extracted, the electronic controller 24 being configured to calculate the speed of the object 31 based on the Doppler effect, for example (e.g., using the FFT module 64). As a result, a lower cost electronic controller 24 can be provided capable of more quickly processing activation gestures. The signal processor 75 (or electronic controller 24) is illustrated as disposed in communication with the antenna elements 26, 28 through signal processing element such as high/low gain signal amplifiers 76, a mixer 78 configured to mix the received waves or signal with the transmitted waves or signal generated by a waveform generator 80 and oscillator 82 as received from a splitter 84 for processing the received reflections of the radar waves.

Now referring to FIG. 8, there is illustratively shown the at least one sensor subassembly 25" employing higher resolution FMCW radar. The higher resolution FMCW radar of the at least one sensor subassembly 25" allows for the extraction of multiple features characterizing the gesture of the foot or object 31, such as speed or velocity v of the object 31, as well as angle, shape, size, reflectivity, and distance d of the object 31. In this embodiment, the at least one sensor subassembly 25" employs at least one transmit antenna 26 for transmitting the FMCW radar signal 86, and at least one receive antenna 28 for receiving the reflected radar signal, and the electronic controller 24 being configured to determine the specific motions of the user/object 31. With such a configuration, the detection system 11 is operable to detect a gesture/motion (and characteristics) of the object 31 using the Frequency Modulated Radar techniques (i.e., processing by the electronic controller 24, of the reflected FMCW radar signal to determine frequency shifts indicative of the speed (Doppler frequency) and distance d (beat frequency) of the object 31). Alternatively, the at least one sensor subassembly 25''' can be configured to include at least two receive antennas $26_1, 26_2,$ to $26_n$ forming an antenna array, as shown in FIG. 9 for capturing received reflected electromagnetic signals such as FMCW radar signals so that the captured received reflected electromagnetic signals can be processed by the electronic controller 24 to extract a data set containing data relating to the distance and angles of the motion/object 31 relative to the at least two receive antennas $28_1, 28_2,$ to $28_n$. Also, multiple transmit antennas 26n may be provided. As a result, a more powerful microcontroller (MCU) (e.g., electronic controller 24) can be provided capable of rapidly extracting data, such as speed v, angle, distance d, and reflectivity or size data, from reflected radar signal, to more accurately differentiating (higher accuracy) any activation gestures between different users. In accordance with another embodiment, the configuration of the at least one sensor assembly 25', 25", 25''' can be utilized in the above described detection system 11 for providing a higher accuracy detection system.

Figure 10:
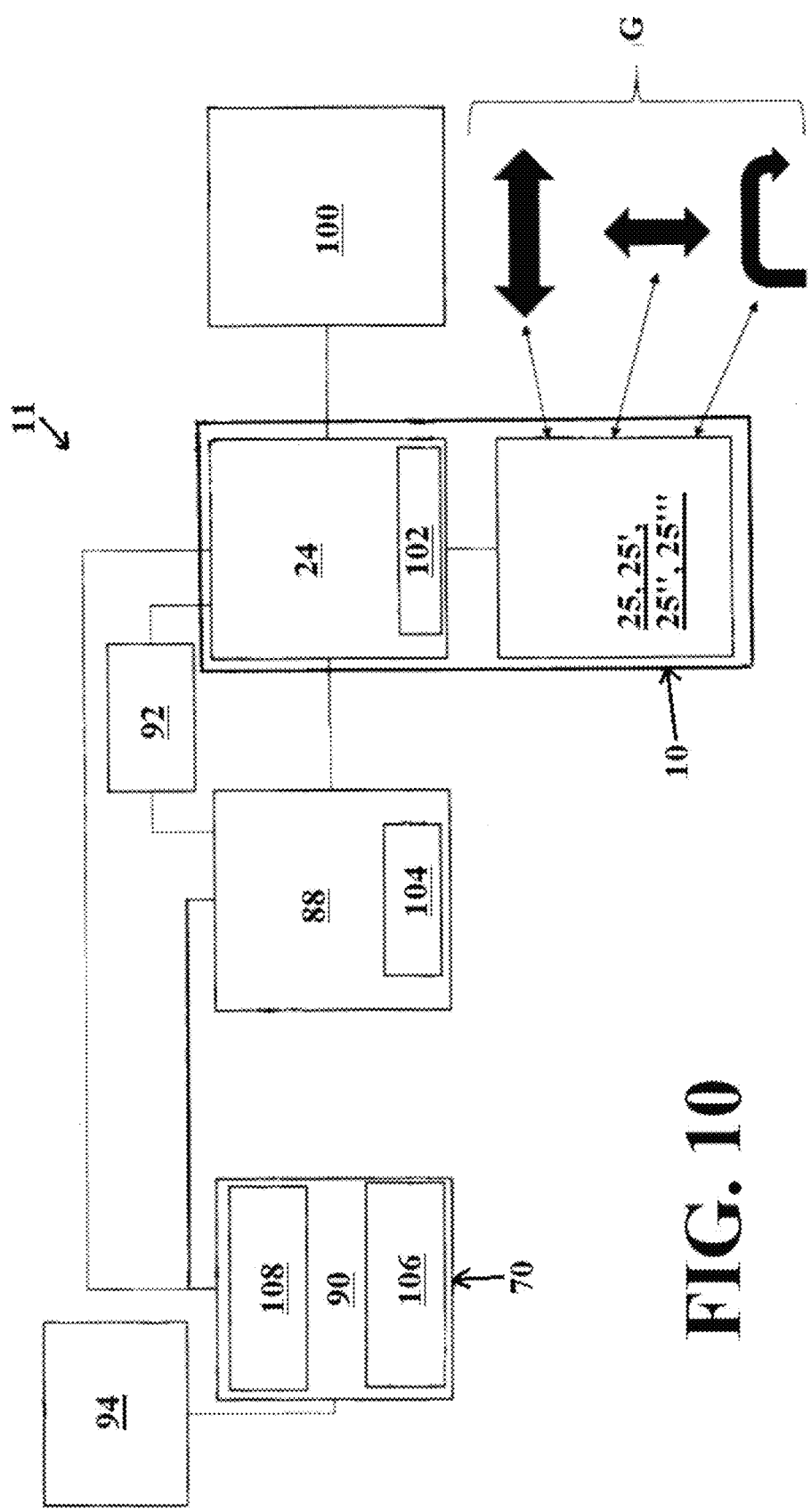
FIG. 10 is a block diagram of a first exemplary embodiment of the detection system according to aspects of the disclosure.

As discussed above, the detection module 10 including the at least one sensor assembly 25, 25', 25", 25''' may comprise part of the detection system 11 for user-activated, non-contact activation of the powered closure panel 12, 12' of the vehicle 14. Thus, as best shown in FIG. 10, a first exemplary embodiment of the detection system 11 includes the detection module 10 in addition to a controller arrangement 24, 88, 90, 92 that is coupled to the at least one sensor subassembly 25, 25', 25", 25''' to detect a gesture or gesture sequence G. As discussed above, the controller arrangement 24, 88, 90, 92 is operable in any one of the plurality of gesture type detection modes and can be configured to select one of the plurality of gesture detection modes based on the user input.

Figure 11:
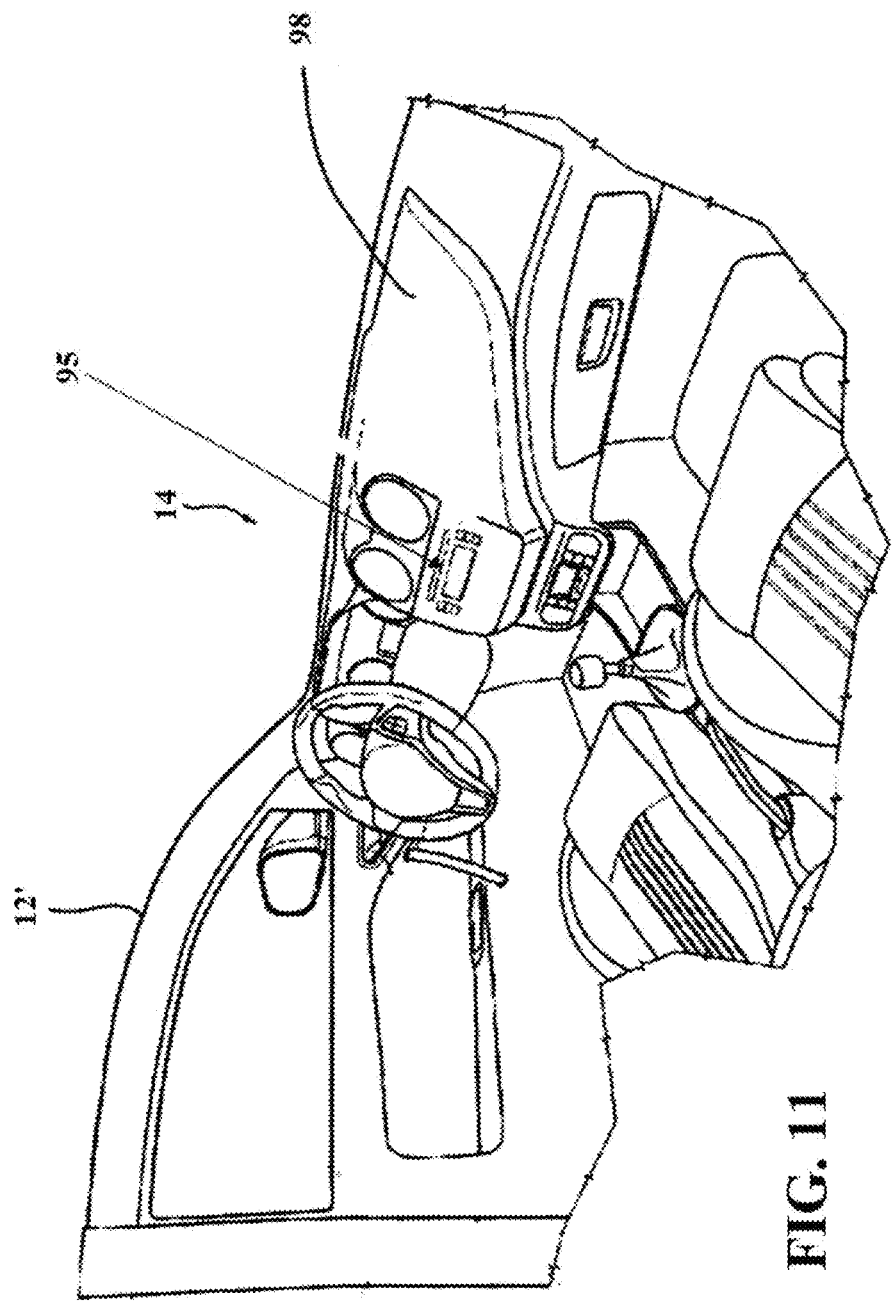
FIG. 11 illustrates a user interface of the detection system according to aspects of the disclosure.
Figure 11A:
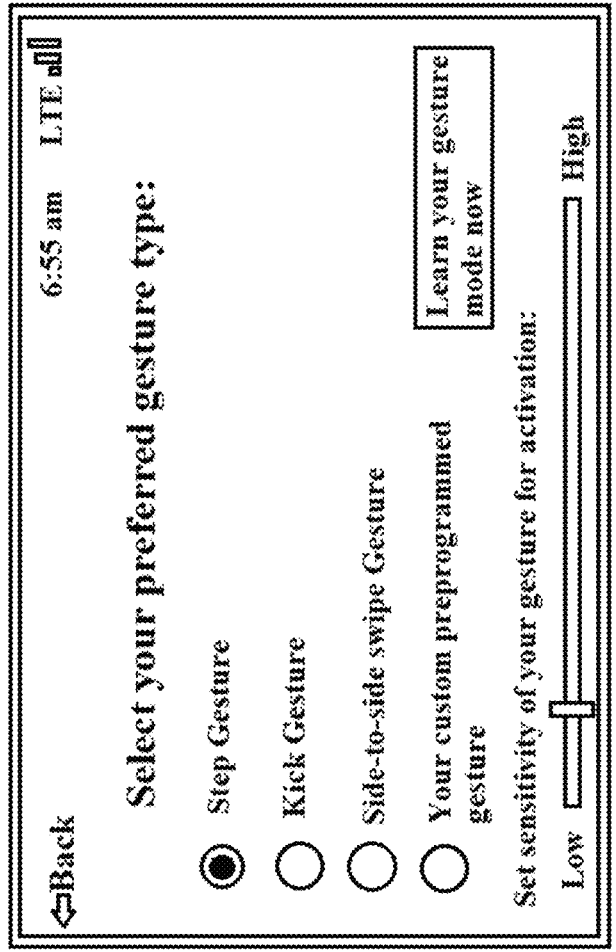
FIGS. 11A and 11B are illustrative examples of various user selectable options and parameters displayed on a user interface according to aspects of the disclosure.
Figure 11B:
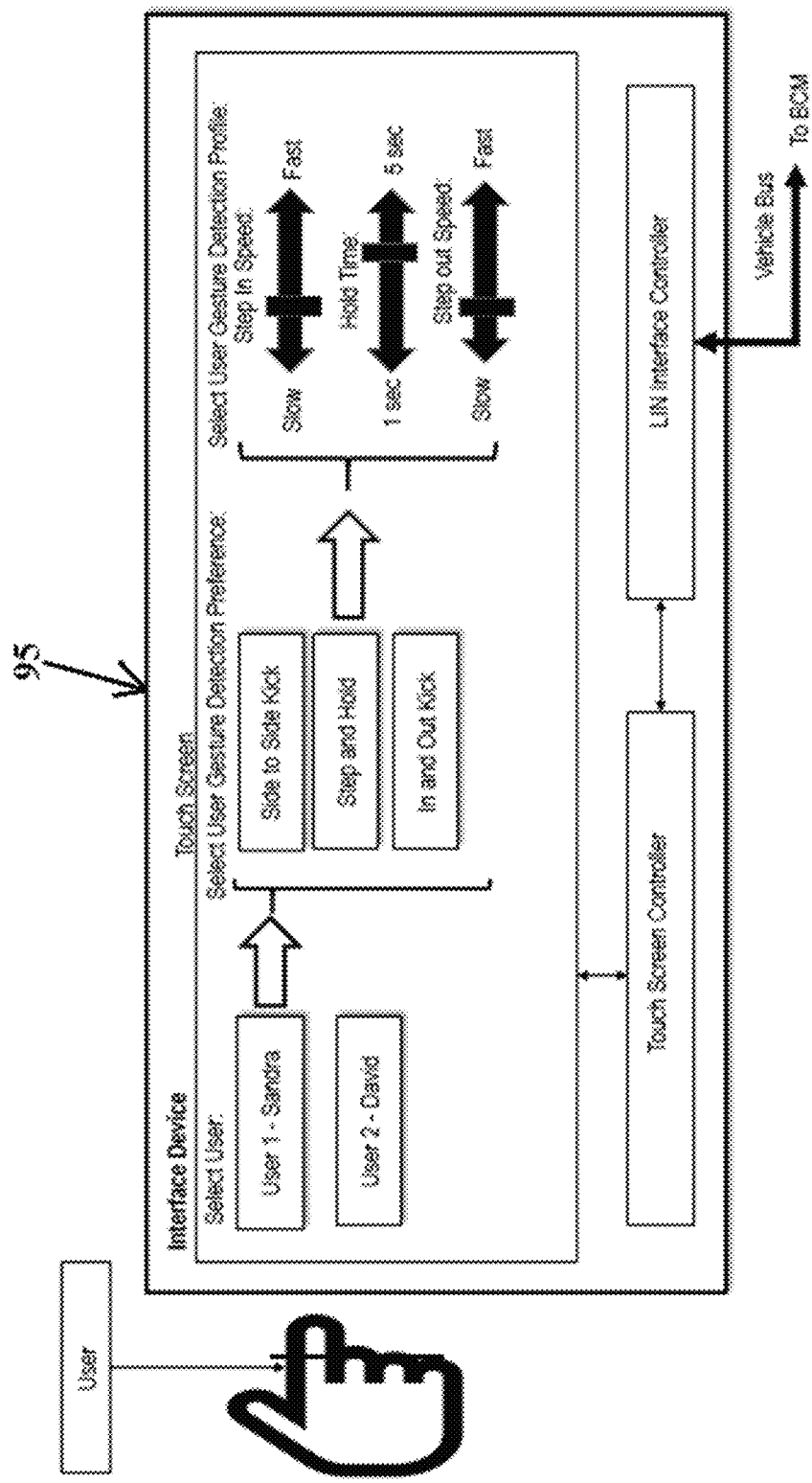

In more detail, the detection system 11 also includes a gesture selector 94, 96 in communication with the controller arrangement 24, 88, 90, 92 for accepting a user input from a user to select the valid activation gesture. The gesture selector 94, 96 of the first exemplary embodiment of the detection system 11 is a user interface 94 configured to accept the user input from the user. For example, the user interface 94 can be incorporated into an infotainment system 95 within a cabin 98 of the vehicle 14, as best shown in FIG. 11 and FIG. 11A. FIG. 11A illustrates the interface 94, such as a touch screen display in accordance with one example presenting various configuration options to a user capable of interacting with the interface 94 to input his selection of presented parameters or options. For example a gesture detection mode can be selected by a user, the sensitivity of the selected gesture can be selected e.g. how much deviation from a valid activation gesture the system will still determine as a gesture to result in an activation command e.g. open closure member. For example, the user's gesture may be set to trigger a closure panel or vehicle system command when 95% accurate to the stored valid gesture, or may be set to trigger a closure panel or vehicle system command when 90% accurate to the stored valid gesture, and so on and so forth. Also an option for the user to have his gesture learned by the system e.g. the user can select the "Learn your gesture mode now" icon on the interface 94 and the user will have a period of time to exit the cabin and proceed to have their preferred baseline gesture registered by the system (e.g. stored in memory 142) as detected by the at least one sensor subassembly 25, 25', 25", 25'''. The vehicle can guide the user when inputted their baseline preferred gesture, such as through the audio system issuing audio commands and steps and receiving confirmations from a user using a microphone, (e.g. "Proceed to the sensor. Are you at the sensor? Next, input your preferred gesture now. Have you completed the gesture? Are you happy with your gesture to be learned? Please repeat your gesture three addition times for confirmation. Your custom preferred gesture has not been learned"). While a foot based gesture is illustrated, other parts of a user's body may be recognized as a gesture, such as a hand movement, head movement, gait, multiple different body part movements, and the like. FIG. 11B illustrates other parameters or options displayed to a user via the user interface 94, for example by the infotainment system 95 of FIG. 11. Illustrated are individual user customizable gesture selection parameters, such as gesture type, and user adjustable sub-parameters related to the selected gesture type. For example, within the "Step and hold" gesture type, various parameters related to such a gesture type can be selected for customizing the detection of the gesture, such as how long (e.g. fast to slow) a step-in to be detected should occur, how long a hold on the floor to be detected should occur, and how long (e.g. fast to slow) a step-out to be detected should occur.

Other characteristics of the sub-gestures for completing a gesture may be selected by a user in such a manner. In a possible configurations, such parameters or options may not be displayed by the user interface 94, and remain only accessible to a servicing party and not by the user e.g. via a communication port for system servicing.

The controller arrangement 24, 88, 90, 92 is configured to receive the user input from the gesture selector 94, 96 and adjust at least one of a plurality of predetermined thresholds representing the valid activation gesture by the user required to move the closure panel 12, 12' based on the user input. The controller arrangement 24, 88, 90, 92 is also configured to receive and analyze the sensor signal from the at least one sensor subassembly 25, 25', 25", 25''' and determine whether the sensor signal is within the plurality of predetermined thresholds. The controller arrangement 24, 88, 90, 92 then initiates movement of the closure panel 12, 12' in response to the sensor signal being within the plurality of predetermined thresholds representing the valid activation gesture.

Referring back to FIG. 10, the controller arrangement 24, 88, 90, 92 can include the electronic controller 24 of the detection module 10 operating in one of the plurality of gesture type detection modes and coupled to the at least one sensor subassembly 25, 25', 25", 25''' and to a power actuator 100 of the closure panel 12, 12' in the first exemplary embodiment of the detection system 11. The electronic controller 24 also includes a module local interconnect network interface 102. The controller arrangement 24, 88, 90, 92 also includes a body control module 88 coupled the electronic controller 24 and including a body control local interconnect network interface 104. The controller arrangement 24, 88, 90, 92 additionally includes a master vehicle node 90 operable with a plurality of gesture operation mode statuses 106 and a plurality of preloaded detection algorithms 108 corresponding to the user input and coupled the electronic controller 24 and including a master node local interconnect network interface 110 and coupled to the body control module 88 and to the electronic controller 24 and in communication with the user interface 94 (e.g., electrically coupled thereto as shown in FIG. 10). So, while the electronic controller 24 is described above as processing the sensor signal, the master vehicle node 90 of the first exemplary embodiment of the detection system 11 may process the sensor signal in addition to, or in place of processing carried out by the electronic controller 24. The detection system 11 further includes a fob 92 in communication with at least one of the electronic controller 24 and the body control module 88. It should be appreciated that the controller arrangement 24, 88, 90, 92 may have fewer or additional elements besides those shown.

Figure 12:
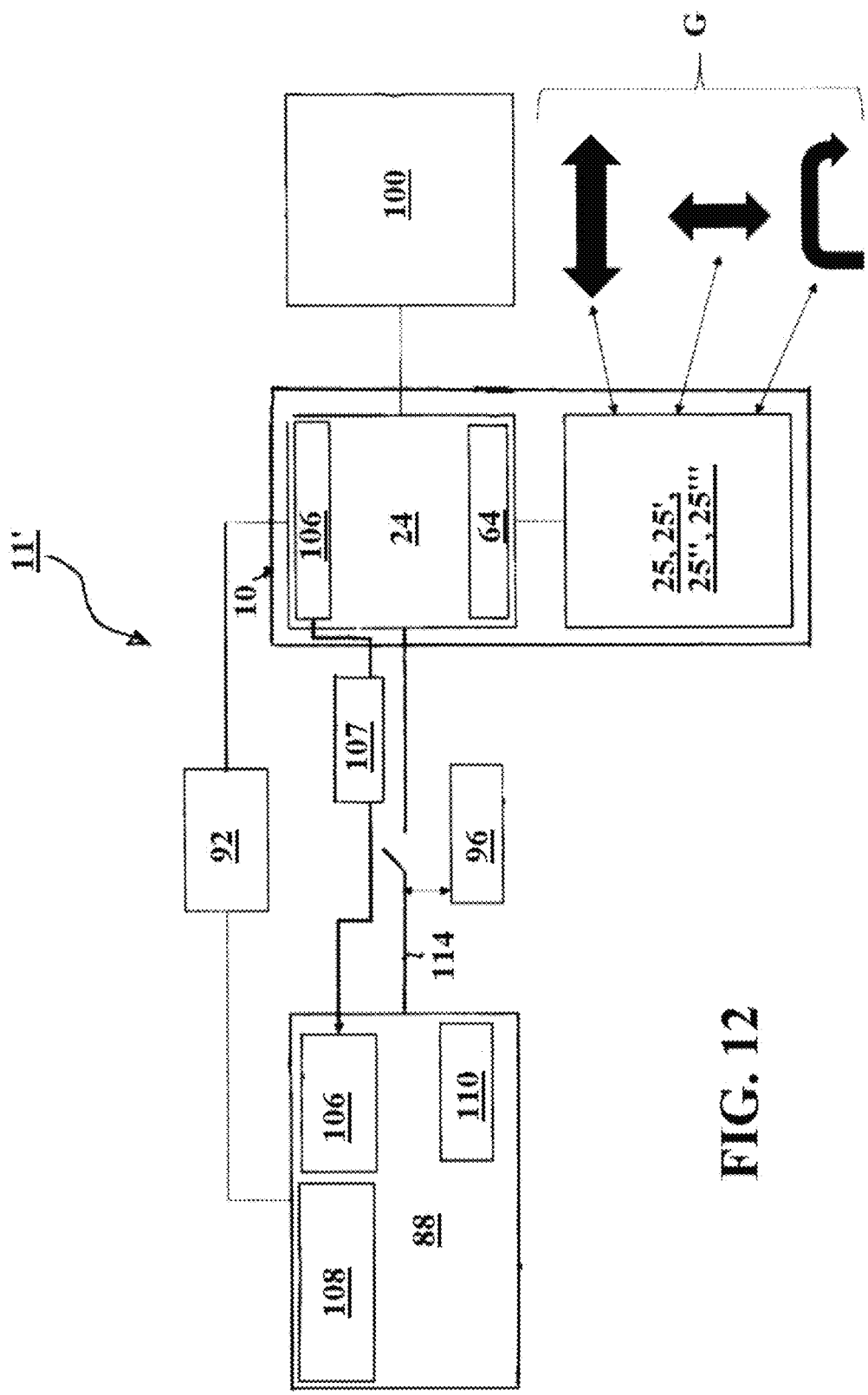
FIG. 12 is a block diagram of a second exemplary embodiment of the detection system according to aspects of the disclosure.

As best shown in FIG. 12, a second exemplary embodiment of the detection system 11' includes the detection module 10 in addition to another controller arrangement 24, 88, 90, 92. The controller arrangement 24, 88, 90, 92 includes the electronic controller 24 of the detection module 10 operating in one of the plurality of gesture type detection modes and storing the plurality of gesture operation mode statuses 106. The electronic controller 24 is coupled to the at least one sensor subassembly 25, 25', 25", 25''' and to the power actuator 100 of the closure panel 12, 12'. The electronic controller 24 includes the module local interconnect network interface 102.

The controller arrangement 24, 88, 90, 92 of the second exemplary embodiment of the detection system 11' also includes the body control module 88 operable with the plurality of gesture operation mode statuses 106 and the plurality of preloaded detection algorithms 108 and coupled to the electronic controller 24 and including the body control local interconnect network interface 104. The electronic controller 24 is configured to communicate the one of the plurality of gesture operation mode statuses 106 (e.g., a step mode 107) to the body control module 88 in response to the coupling of the electronic controller 24 to the body control module 88 and the body control module 88 is configured to synchronize with the electronic controller 24 and process the sensor signal from the at least one sensor subassembly 25, 25', 25", 25''' using at least one of the plurality of preloaded detection algorithms 108. For example, the body control module 88 operating as a master LIN node may operate in a configuration mode, for example in a LIN Diagnostic Mode to change the operating mode of the gesture detection system. The master LIN node may operate in such diagnostic mode in response to a configuration of the master LIN node, for example as a result of a user initiated action to change the operating mode of the gesture detection system.

Still referring to FIG. 12, the second exemplary embodiment of the detection system 11' additionally includes a fob 92 (e.g., a key fob carried by the user) in communication with at least one of the electronic controller 24 and the body control module 88 and wherein the electronic controller 24 is configured to communicate an operating mode (e.g., one of the plurality of gesture type detection modes identified by a corresponding one of the plurality of gesture operation mode statuses 106) to the body control module 88.

The gesture selector 94, 96 of the second exemplary embodiment of the detection system 11' is a tool 96 for selectively coupling to the body control module 88 through the body control local interconnect network interface 104 (e.g., used by an original equipment manufacturer or OEM). More specifically, the body control module 88 is selectively decoupled from the electronic controller 24 of the detection module 10 in response to the tool 96 being selectively coupled to the body control module 88. The tool 96 is configured to set one of the plurality of gesture operation mode statuses 106 of the body control module 88.

Figure 13:
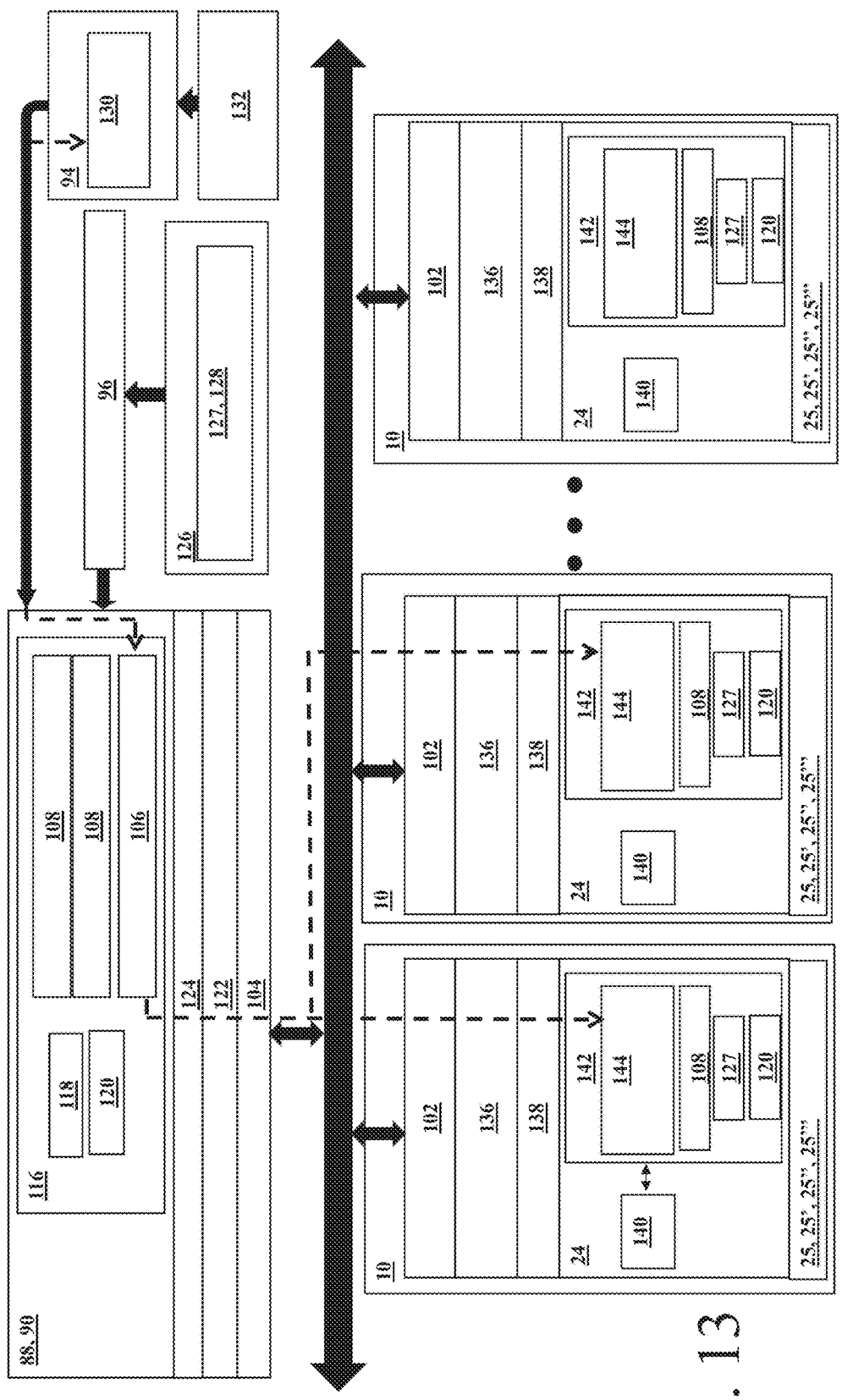
FIG. 13 is a system diagram of a gesture detection system according to aspects of the disclosure.

FIG. 13 illustrates the communication of configuration data over a vehicle bus 114 (e.g., LIN bus) based on a change using the user interface 94, for example. The BCM 88 (or master vehicle node 90) has a memory 116 storing the plurality of gesture detection algorithms 108 (e.g., a first and a second gesture algorithm are shown) and a plurality of gesture detection mode setting parameters or gesture operation mode statuses 106. The memory 116 also includes a master task 118 and a slave task 120. Again, the BCM 88 includes the body control local interconnect network interface 104 with body serial communication block 122 and functioning as a master communication network (LIN or local interconnect network) node 124. The tool 96 is in communication with the BCM 88 and stores or accepts a configuration file 126 including a sensor operating detection mode from a slave with identification 128 (i.e., slave identification 127). The user interface 94 is also shown in communication with the BCM 88 and displays a sensor operating detection mode 130 and receives the user preference or user input 132.

Each of a plurality of slave sensors 134 (e.g., detection module 10) are in communication with the BCM 88 over the vehicle bus 114 via the module local interconnect network interface 102 with module serial communication block 136 and functioning as a slave communication network (LIN) node 138. And each includes the electronic controller 24 with a module processing unit 140 (e.g., microprocessor) coupled to the sensor hardware (e.g., sensor subassembly 25, 25', 25", 25''') and to a memory 142. The memory 142 stores sensor operating detection mode parameters 144, one of the plurality of gesture detection algorithms 108, an identifier or slave identification 127 (e.g., a unique identifier for each detection module 10), and the slave task 120.

Figure 14:
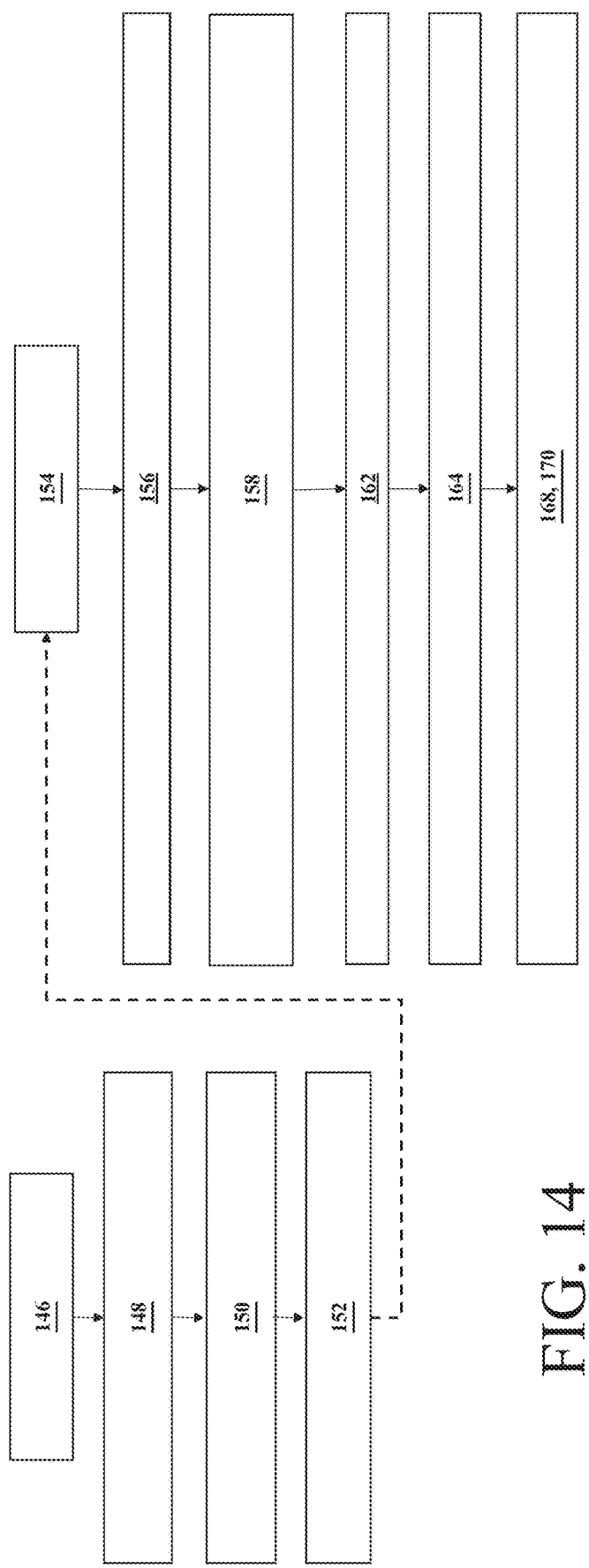
FIG. 14 is a flowchart of steps executed by a controller arrangement shown in FIG. 13 for modifying a gesture detection mode of the gesture detection system according to aspects of the disclosure.

The controller arrangement 24, 88, 90, 92 is configured to execute illustratively the steps as illustrated in FIG. 14 to display selectable operating mode possibilities on the user interface 94 and configure the BCM 88 and the sensor subassembly 25, 25', 25", 25'" based on the detected user gesture mode selected using the user interface 94. In more detail, the steps of FIG. 14 include 146 starting a user modifiable parameter mode. Next, 148 reading and displaying sensor operating detection mode 130 (e.g., the plurality of predetermined thresholds) on the user interface 94. The next step is 150 receiving a user input 132 from the user to modify the plurality of gesture detection mode setting parameters or gesture operation mode statuses 106. Then, the next step is 152 storing the user input change to the plurality of gesture detection mode setting parameters or gesture operation mode statuses 106. Next, 154 starting a diagnostic mode and 156 reading the plurality of gesture detection mode setting parameters or gesture operation mode statuses 106 with a master node (e.g., master vehicle node 90 or BCM 88). Then, 158 executing a master task 118 for setting sensor operating detection mode parameters 144 using an updated LIN scheduling table 160 (FIG. 17) and 162 broadcasting frame headers using the updated LIN scheduling table and frame message including the sensor operating mode. The next steps are 164 updating sensor operating detection mode parameters 144 in a memory 142 of a slave node 10 in response to receiving a master task header of a diagnostic frame 166 and 168 updating the sensor operating detection mode parameters 144 in the memory 142 of the slave node 10 in response to receiving the master task header of the diagnostic frame 166 and 170 transmitting a response 171 to the master node (e.g., master vehicle node 90 or BCM 88) using the slave node 10 confirming the setting of the sensor operating detection mode parameters 144.

Figure 15:
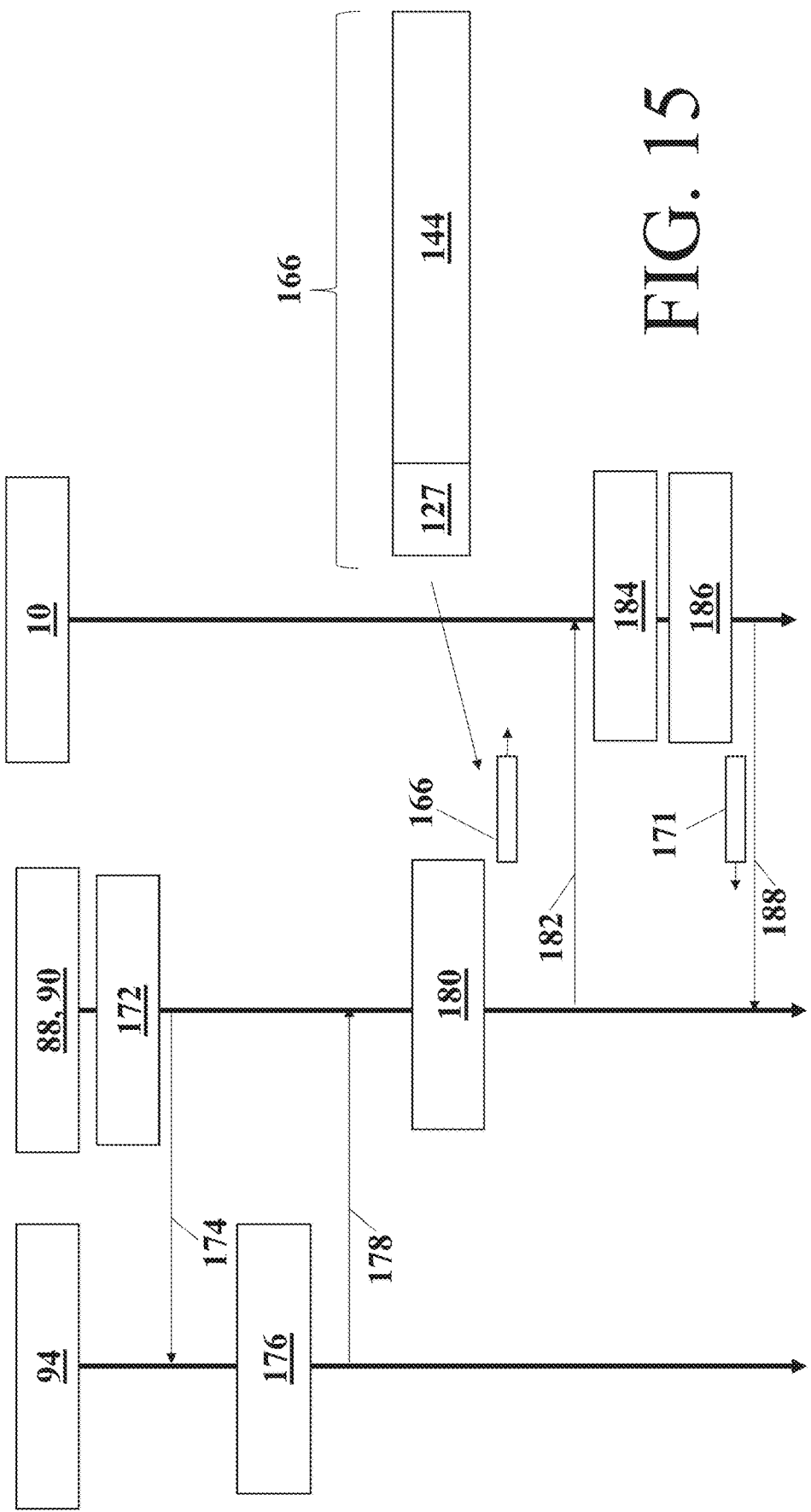
FIG. 15 is a sequential diagram of the gesture detection system illustrating the exchange of communications over a vehicle bus for modifying the gesture detection mode of the gesture detection system in accordance with an illustrative embodiment.

FIG. 15 illustrates a sequential diagram illustrating the exchange of data and the operations executed by the controller arrangement 24, 88, 90, 92. The plurality of gesture detection mode setting parameters or gesture operation mode statuses 106 are read by the BCM 88 or master vehicle node 90 at 172 and transmitted at 174. At 176, the sensor operating detection mode 130 (e.g., the plurality of predetermined thresholds) are displayed on the user interface 94 and changed by the user input 132. At 178, the sensor operating detection mode 130 is transmitted to the BCM 88 or master vehicle node 90. At 80, a master task 118 is executed for setting sensor operating detection mode parameters 144 and at 182 diagnostic frames or frame headers 166 are transmitted including the sensor operating mode that has been updated. At 184 updating sensor operating detection mode parameters 144 in the memory 142 of the slave node 10 and at 186 executing the slave task 120 to update the sensor operating detection mode parameters 144 in the memory 142 of the slave node 10. At 188, transmitting the response 171 to the master node (e.g., master vehicle node 90 or BCM 88) using the slave node 10 confirming the setting of the sensor operating detection mode parameters 144.

Figure 16:
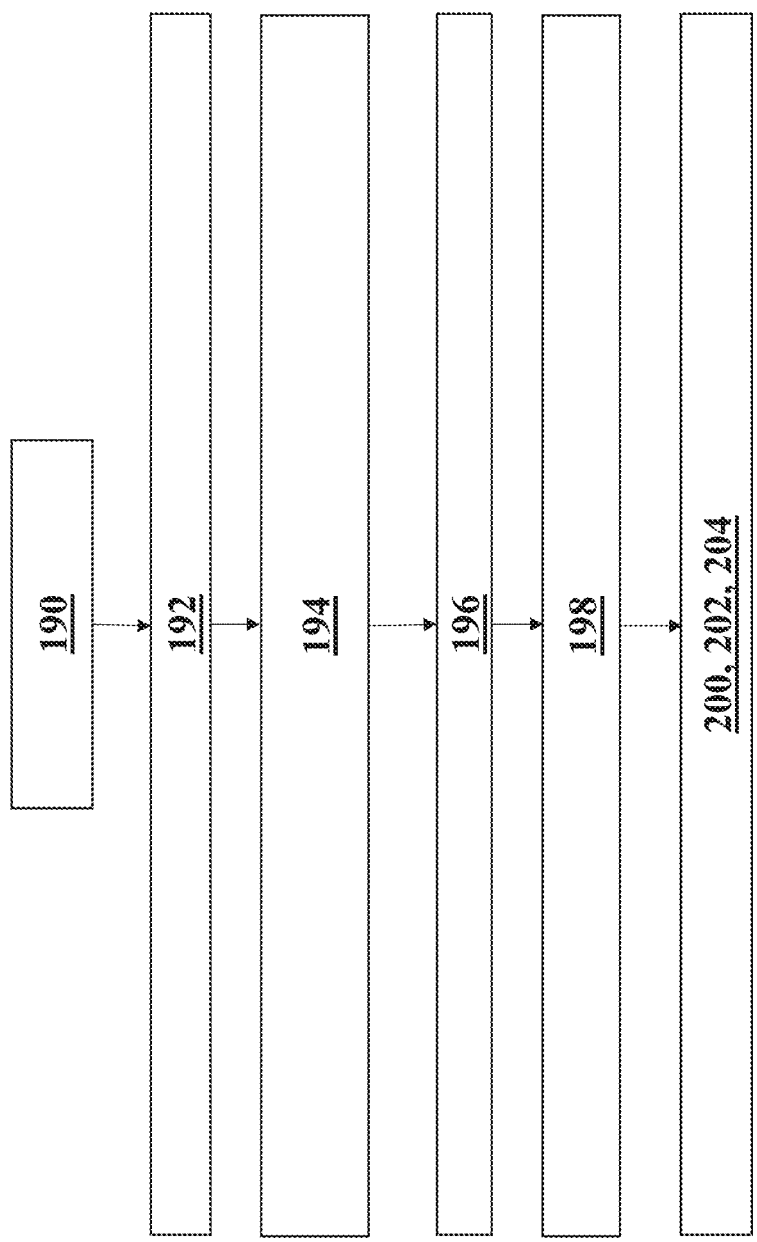
FIG. 16 is a flowchart of steps executed by the controller arrangement for modifying the gesture detection mode of the gesture detection system according to aspects of the disclosure.
Figure 17:
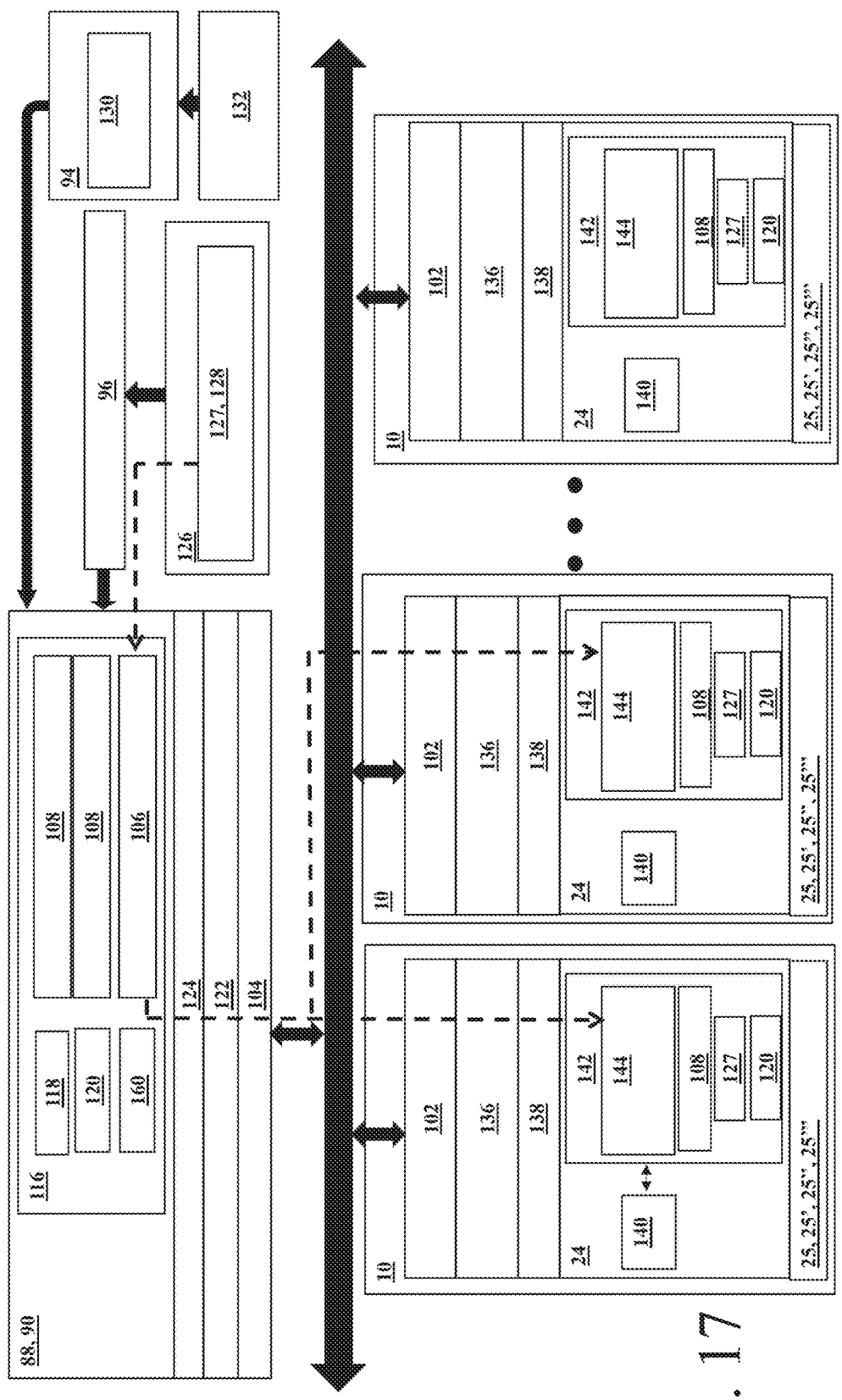
FIG. 17 is a system diagram of a gesture detection system according to aspects of the disclosure operating according to the steps of FIG. 16.

With reference to FIG. 16-18, the master LIN node (e.g., master vehicle node 90) may operate in such diagnostic mode in response to a configuration of the master LIN node (e.g., BCM 88 or master vehicle node 90), for example as a result of an OEM initiated operation, for example by connection of the tool 96 to the vehicle bus 114 or directly for uploading the configuration file 126 to the master LIN node (e.g., the BCM 88 or master vehicle node 90), to configure the gesture detection mode of the system 11, 11'. In response to such an OEM initiated configuration operation, a controller arrangement 24, 88, 90, 92 is configured to execute illustratively the steps as illustrated in FIG. 16 to configure the BCM 88 and the sensor subassembly 25, 25', 25", 25'" based on the OEM desired gesture detection mode reflected in the configuration file. Specifically, the steps of FIG. 16 include 190 starting an OEM configuration mode. Next, 192 extracting sensor calibration mode corresponding to gesture operation mode statuses 106 from the configuration file 126 using the BCM 88 or master vehicle node 90. Then, 194 configuring the BCM 88 or master vehicle node 90 to operate in a gesture operation mode status 106 based on the sensor calibration mode extracted from the configuration file 126. The next step is 196 executing a master task 118 for setting sensor operating detection mode parameters 144. Next, 198 broadcasting frame headers or diagnostic frames 166 over the vehicle bus 114 including the sensor operating mode. The next steps are 200 updating sensor operating detection mode parameters 144 in a memory 142 of a slave node 10 in response to receiving a master task header of the diagnostic frame 166 and 202 updating the sensor operating detection mode parameters 144 in the memory 142 of the slave node 10 in response to receiving the master task header of the diagnostic frame 166 and 204 transmitting a response 171 to the master node (e.g., master vehicle node 90 or BCM 88) using the slave node 10 confirming the setting of the sensor operating detection mode parameters 144.

FIG. 17 illustrates the communication of the configuration file or data over the vehicle bus 114 (e.g., LIN bus) for example. The memory 116 of the BCM 88 is shown with the scheduling table 160, and FIG. 18 illustrates a sequential diagram illustrating the exchange of data and the operations executed by the controller arrangement 24, 88, 90, 92. Thus, in the second exemplary embodiment of the detection system 11', the body control module 88 can process the sensor signal in addition to, or in place of processing carried out by the electronic controller 24. In more detail, in FIG. 18, at 206 the tool 96 transmits the configuration file 126 to the BCM 88 or the master vehicle node 90. At 208, the gesture operation mode status 106 of the BCM 88 or master vehicle node 90 is modified based on the sensor calibration mode extracted from the configuration file 126. At 210, a master task 118 is executed for setting sensor operating detection mode parameters 144. Next, at 212 the BCM 88 or master vehicle node 90 broadcasts frame headers or diagnostic frames 166 over the vehicle bus 114 including the sensor operating mode. At 214 sensor operating detection mode parameters 144 are updated in a memory 142 of a slave node 10 in response to receiving a master task header of the diagnostic frame 166 and at 216 the sensor operating detection mode parameters 144 are updated in the memory 142 of the slave node 10. At 218, a response 171 is transmitted to the master node (e.g., master vehicle node 90 or BCM 88) using the slave node 10 confirming the setting of the sensor operating detection mode parameters 144.

The plurality of gesture type detection modes (e.g., detected using the plurality of preloaded detection algorithms 108) can include a stationary foot hold gesture mode. Accordingly, the valid activation gesture can include a stationary hold gesture, as shown in FIGS. 19A-19E. So, for example in the first exemplary embodiment of the detection system 11, the user can use the user interface 94 to select to detect a foot 31 (e.g., a stationary foot) placed on the ground level 13 (shown in the side view of 19B and top view of 19C). In addition, the tool 96 of the second exemplary embodiment of the detection system 11' may also be used to make this mode selection. The size of the detection zone 15 can be adjusted based on user preference by increasing detection angle θ and distance d (e.g., FMCW detection thresholds or other thresholds of the plurality of predetermined thresholds representing the valid activation gesture). So the user may expand or vary the detection angle θ and/or the distance d as desired.

Figure 19D:
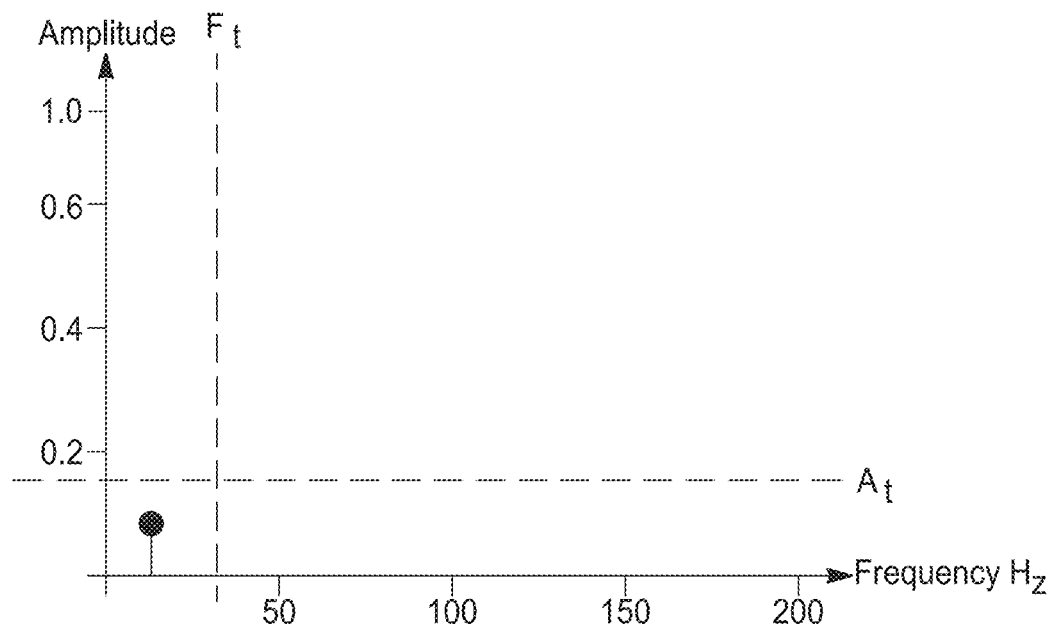
Figure 19E:
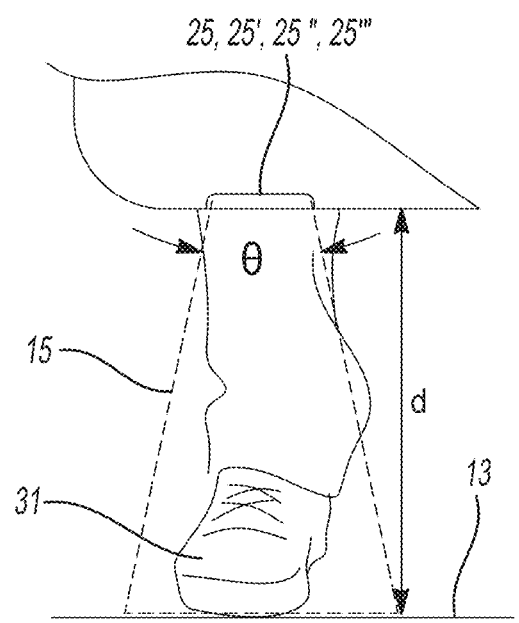

As shown in the top view of FIG. 19C, the foot 31 must stay within the detection zone 15 defined by the detection angle θ and distance d. The FMCW detected speed and amplitude characteristics (e.g., extracted features) can be represented and processed by the controller arrangement 24, 88, 90, 92 in the frequency domain (e.g., using a fast Fourier transform) as shown in FIG. 19D. The plurality of predetermined thresholds can include an amplitude threshold $A_t$ and a frequency threshold Ft set, such that the stationary foot will be detected with a low or no speed (e.g., frequency threshold) and a predetermined amplitude representative of a typical foot 31 at a given distance d. Also, the detection angle θ and distance d can be set as a narrow angle at a predetermined distance. The distance d can be varied (e.g., by the user) depending on whether a hovering foot gesture (e.g., the foot 31 not resting on the ground level 13) is desired to be detected.

Figure 20A:
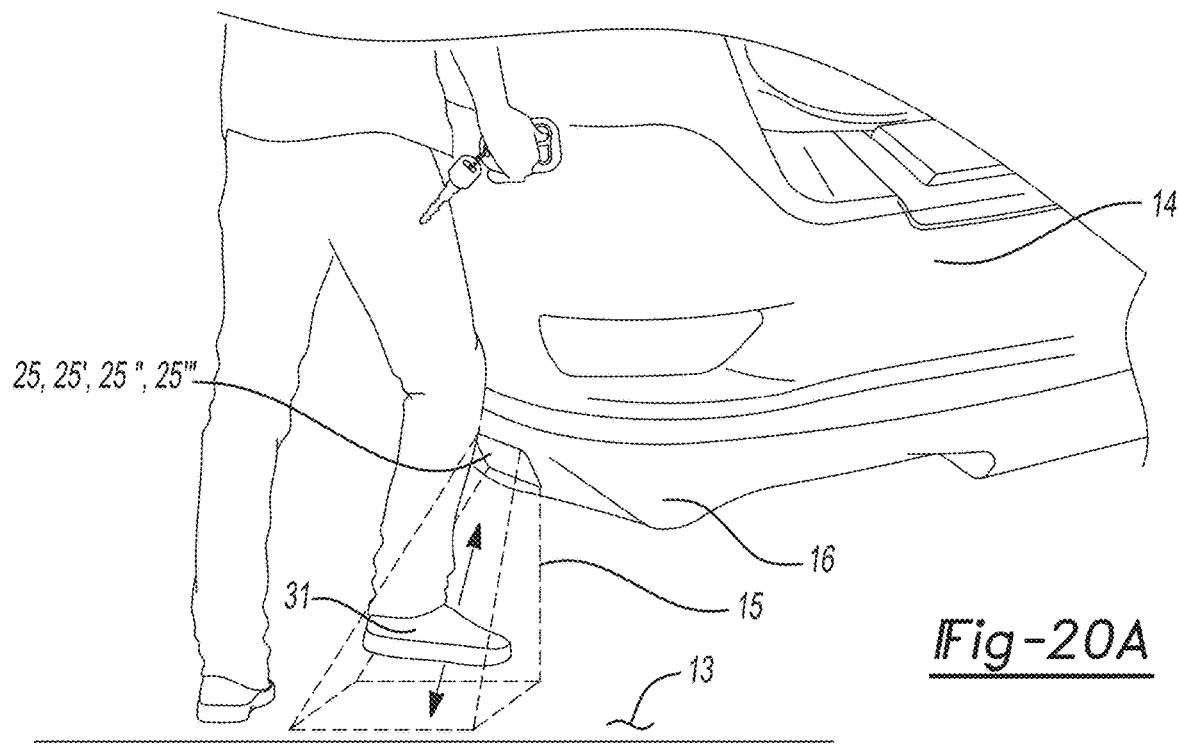
FIGS. 20A-20F illustrate another of the plurality of gesture detection modes of the controller arrangement according to aspects of the disclosure.
Figure 20B:
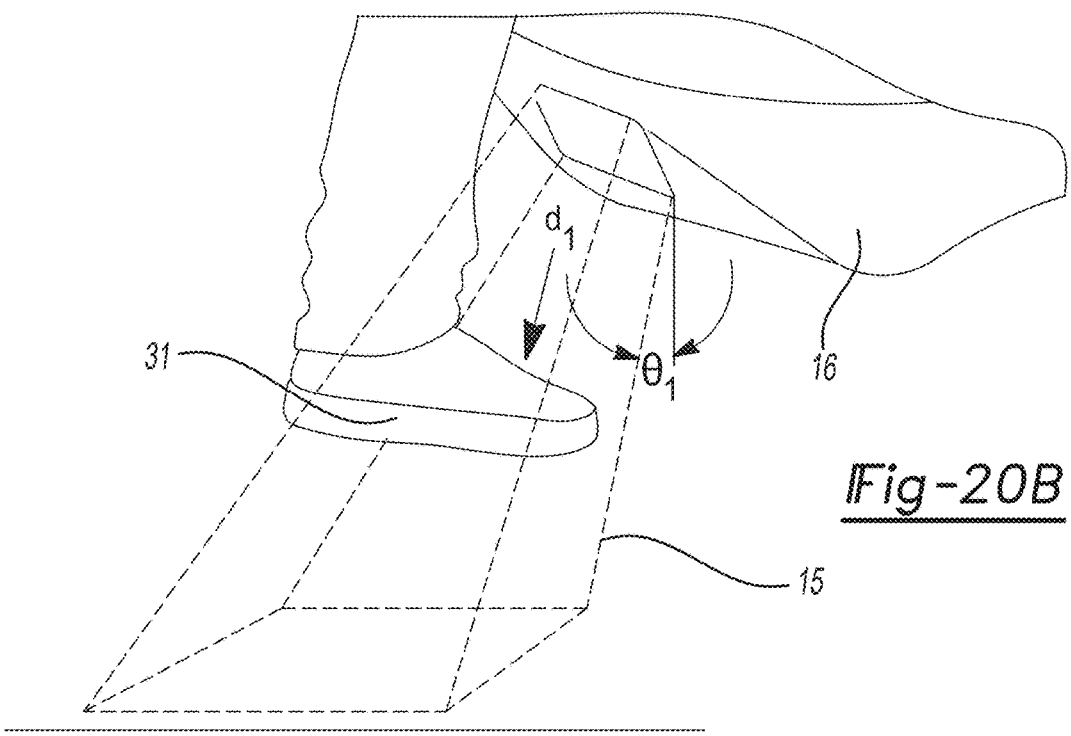
Figure 20C:
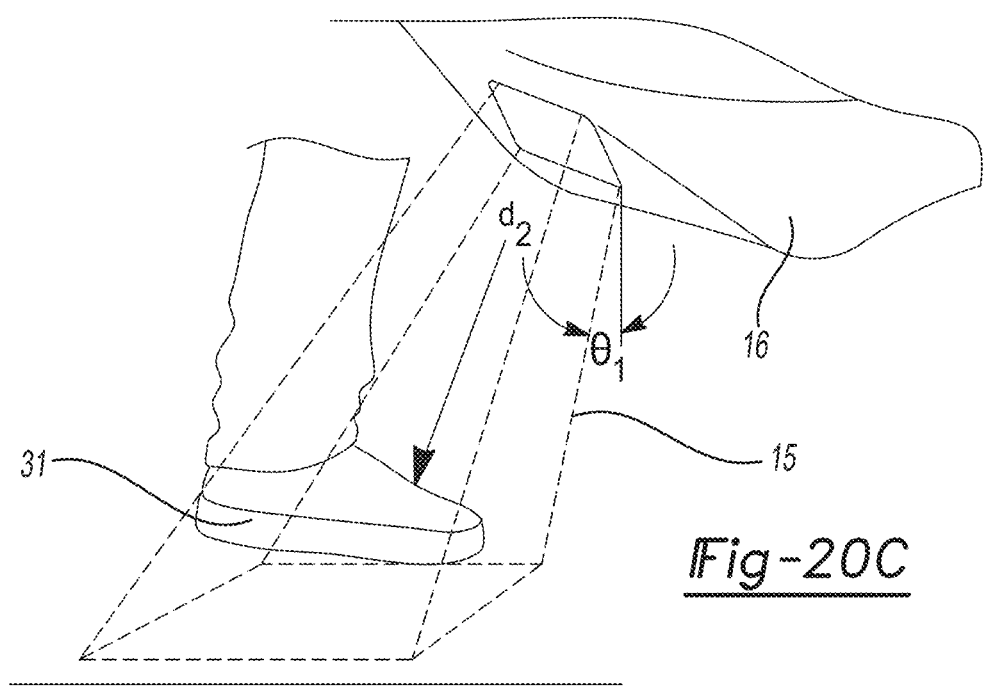
Figure 20D:
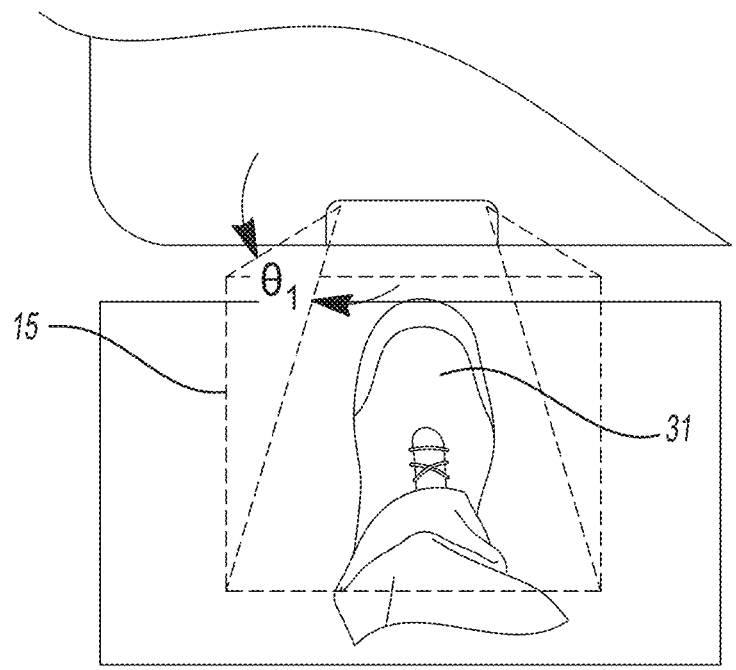

The plurality of gesture type detection modes can include an up and down foot hold gesture mode, as best shown in FIGS. 20A-20F. The valid activation gesture may, for example require that the user get their foot close to the at least one sensor subassembly 25, 25', 25", 25''' then close to the ground level 13, and within a range in between the sensor subassembly 25, 25', 25", 25''' and the ground level 13. So, the user may select to detect an up and down motion (e.g., towards and away from the at least one sensor subassembly 25, 25', 25", 25'''). The user may select the speed of the motion to be detected, as well as the distance thresholds using the user interface 94 of the first exemplary embodiment of the detection system 11 and/or the tool 96 of the second exemplary embodiment of the detection system 11'. In more detail, as shown in FIG. 20B, in a first part of the valid activation gesture, the user may set a first distance threshold d1 with a first detection angle 81 and then as shown in FIG. 20C, for the second part of the valid activation gesture, the user may set a second distance threshold d2 with a second detection angle 82. As shown in the top view of FIG. 20D, the foot must stay within the detection zone 15 defined by the detection angle θ and distance d.

Figure 20E:
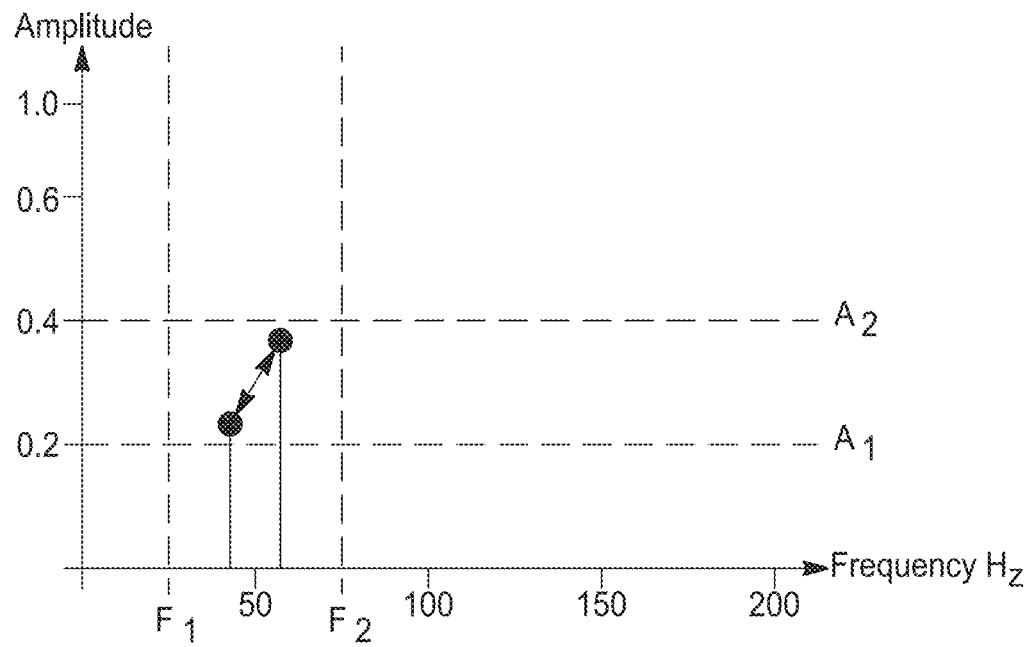
Figure 20F:
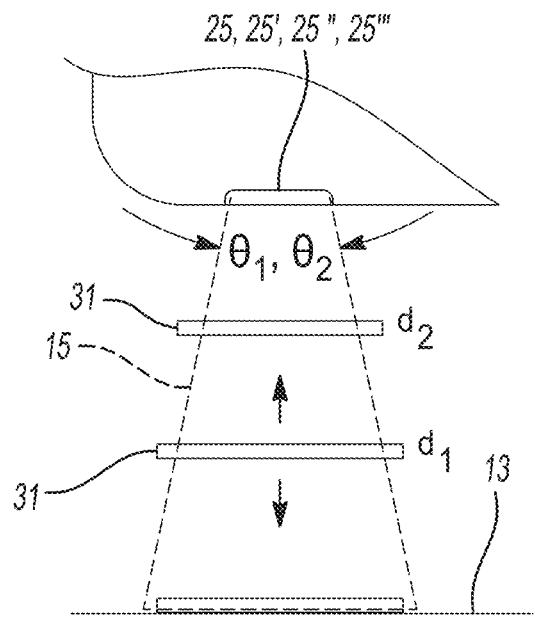

The FMCW detected speed and amplitude characteristics (e.g., extracted features) can be represented and processed by the controller arrangement 24, 88, 90, 92 in the frequency domain as shown in FIG. 20E. The plurality of predetermined thresholds can include a first amplitude threshold A1 and a first frequency threshold F1 set, such that for the first part of the valid activation gesture, the first amplitude threshold A1 corresponds with the first distance threshold d1. Similarly, the plurality of predetermined thresholds can include a second amplitude threshold A2 and a second frequency threshold F2 set, such that for the second part of the valid activation gesture, the second amplitude threshold A2 corresponds with the second distance threshold d2. The user may also select the detection of a desired speed which corresponds with the frequency thresholds F1, F2. So, the predetermined amplitude range (within the amplitude thresholds A1, A2) is representative of the desired foot motion limits (distances d1, d2). Thus, the controller arrangement 24, 88, 90, 92 can be configured to track changes in the FMCW parameters, for example track the amplitude representing the object 31 moving away from the at least one sensor subassembly 25, 25', 25", 25''' (a decrease in amplitude) or toward the at least one sensor subassembly 25, 25', 25", 25''' (an increase in detected amplitude) of the sensor signal. As best shown in FIG. 20F, the corresponding detection angles 81, 82 and distances d1, d2 can be set as narrow angles at predetermined distances by the user.

In addition, as best shown in FIGS. 21A-21E, the plurality of gesture type detection modes can include a side to side foot hold gesture mode. Therefore, the valid activation gesture can include a side to side gesture with a predefined speed and predefined distance ds and predefined angle θs. So the user can select to detect a side to side motion (e.g., laterally toward and laterally away from the at least one sensor subassembly 25, 25', 25", 25"). The user can select the speed of the motion to be detected as well as the distance threshold ds, how broad of as stroke the user has to do based on the angle threshold θs.

Figure 21D:
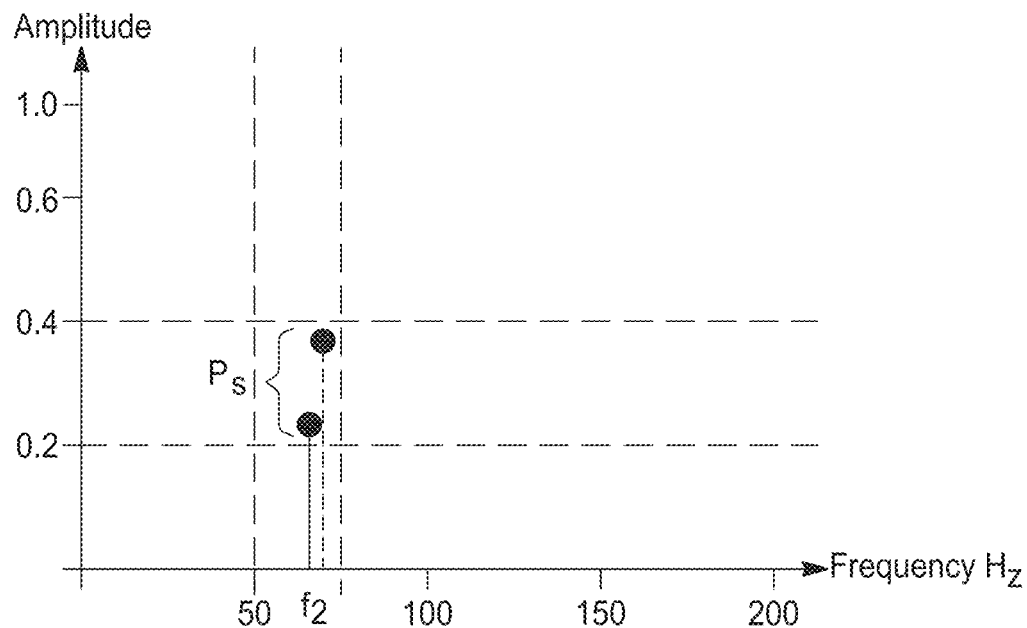
Figure 21E:
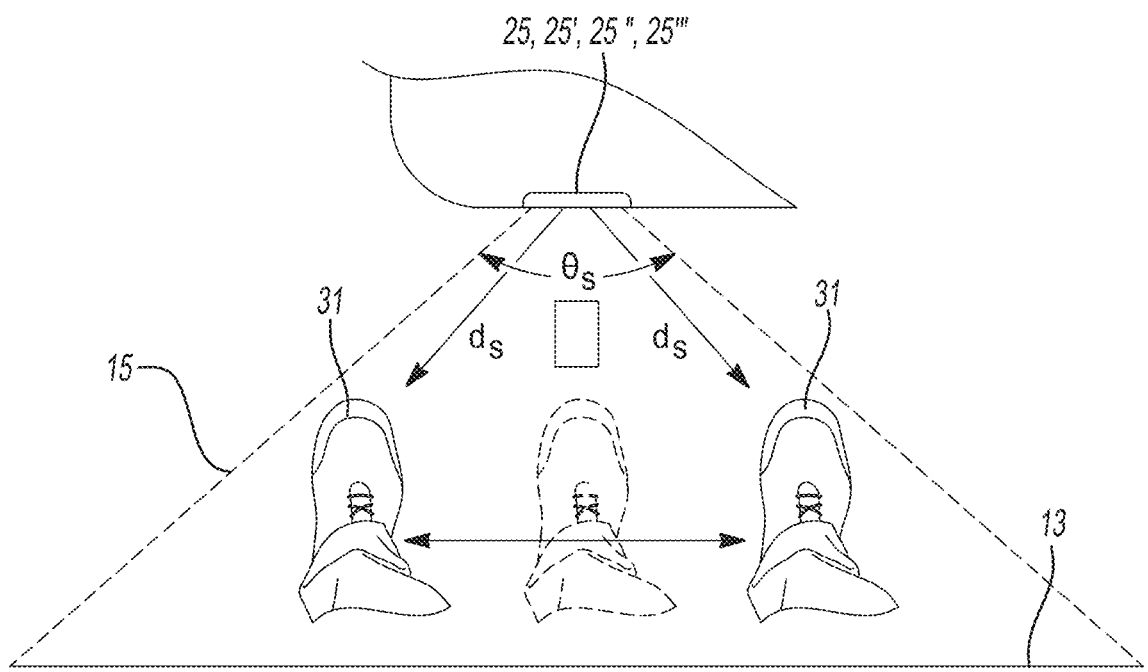

As best shown in FIG. 21D, the FMCW detected speed and amplitude characteristics of the sensor signal can be represented in the frequency domain. The controller arrangement 24, 88, 90, 92 operating in the side to side foot hold gesture mode will use the selected thresholds to detect the desired speed (corresponding to frequency f2 in the frequency domain), predetermined amplitude range shown as $A_s$ in FIG. 21D (corresponding to size or distance ds in the frequency domain) representative of the desired foot motion limits. As shown in FIG. 21E, a wider angle at a predetermined distance can be used to capture the side to side motion and the user can select to expand the angle θs and/or distance ds.

It should be appreciated that the plurality of gesture type detection modes can also include other modes. For example, the valid activation gesture can include other gestures such as, but not limited to a step-in gesture with a predefined speed and predefined approach distance and predefined break point and a gesture within a predetermined time period.

Referring to FIGS. 22-28, another gesture or sequence is shown. Specifically, the valid activation gesture can be a sequence of sub-gestures matching a predetermined sequence of sub-gestures for a user performing a step in gesture and a step out gesture. So, according to an aspect, the predetermined sequence of sub-gestures that represent the valid activation gesture includes a foot of the user (i.e., the object 31) being placed adjacent to the at least one radar sensor subassembly 25, 25', 25", 25''' (i.e., a step-in of the detection zone 15, shown in FIGS. 22 and 23). Next, the foot of the user moving toward the ground 13 in the detection zone 15 (i.e., a step down in the detection zone 15, shown in FIGS. 24 and 25). Then, the foot of the user (i.e., the object 31) being on the ground 13 for a minimum predetermined period of time (i.e., foot on the ground, shown in FIG. 26) and the foot of the user moving off the ground 13 back toward the at least one radar sensor subassembly 25, 25', 25", 25''' of the detection module 10 (i.e., step up, shown in FIG. 27). Finally, the foot of the user being moved nonadjacent to the at least one radar sensor subassembly 25, 25', 25", 25''' (i.e., a step out of the detection zone 15, shown in FIG. 28). Nevertheless, it should be understood that other valid activation gestures are contemplated.

Accordingly, the controller 24 is configured to detect the sequence of sub-gestures consisting of at least one of the object 31 moving towards the at least one radar sensor subassembly 25, 25', 25", 25''', the object 31 moving away from the at least one radar sensor subassembly 25, 25', 25", 25''', and the object 31 not moving relative to the at least one radar sensor subassembly 25, 25', 25", 25''' (i.e., relative to the detection module 10). In other words, the sequence of sub-gestures matching a predetermined sequence of sub-gestures includes the controller 24 detecting a sequence consisting of the object 31 moving towards the at least one radar sensor subassembly 25, 25', 25", 25''' (i.e., step in). Then, the object 31 next moving away from the at least one radar sensor subassembly 25, 25', 25", 25''' (i.e., step down). Next, the object 31 next not moving towards or away from the at least one radar sensor subassembly 25, 25', 25", 25''' (i.e., foot on ground 13). In more detail, the controller 24 is further configured to determine if the sub-gesture whereby the object 31 is not moving towards or away from the at least one radar sensor subassembly 25, 25', 25", 25''' occurs for a minimum predetermined amount of time. The sequence of sub-gestures matching a predetermined sequence of sub-gestures can also include the controller 24 detecting a further sequence consisting of the object 31 next moving towards the at least one radar sensor subassembly 25, 25', 25", 25''' (i.e., step up) and the object 31 next moving away from the at least one radar sensor subassembly 25, 25', 25", 25". The sequence also includes the object 31 next moving out of the detection zone 15 (i.e., step out).

Figure 22:
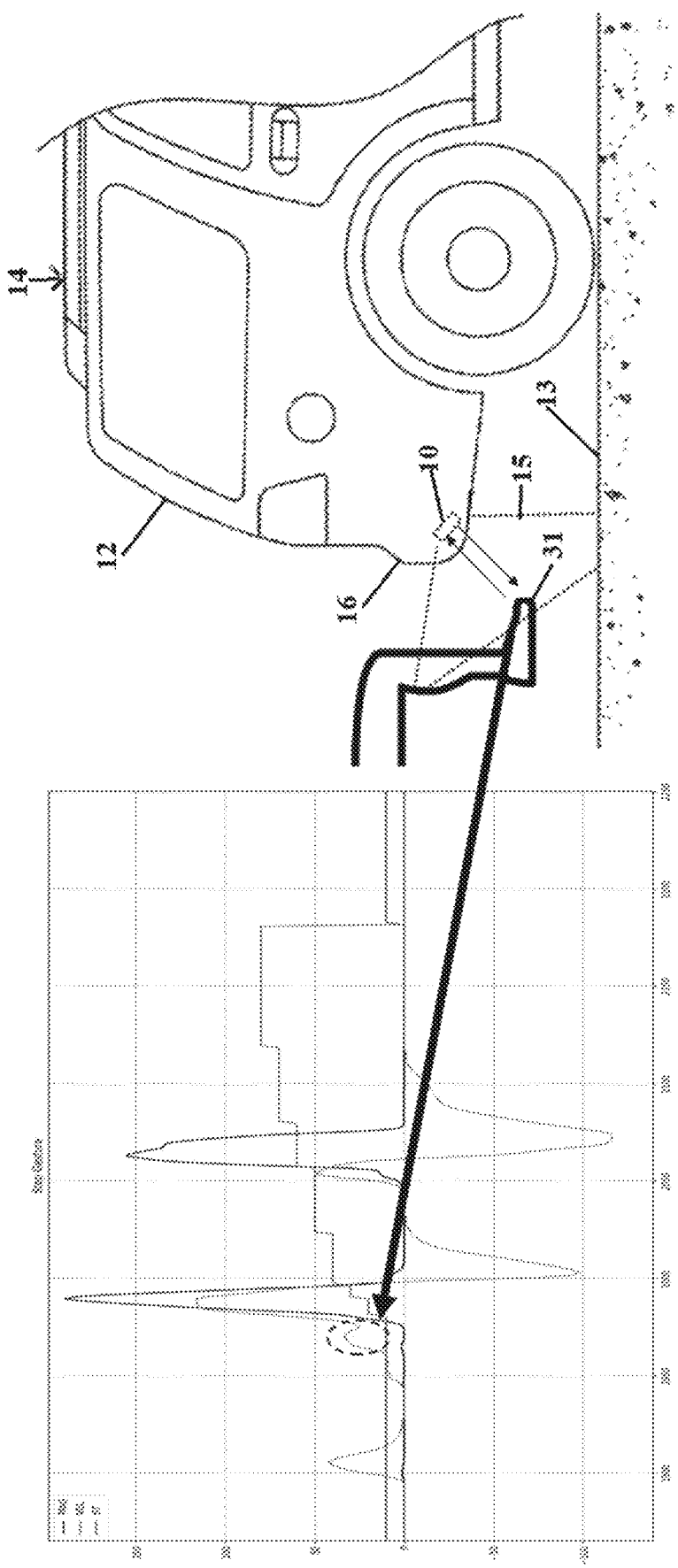
FIGS. 22 and 23 show a step in sub-gesture according to aspects of the disclosure.
Figure 23:
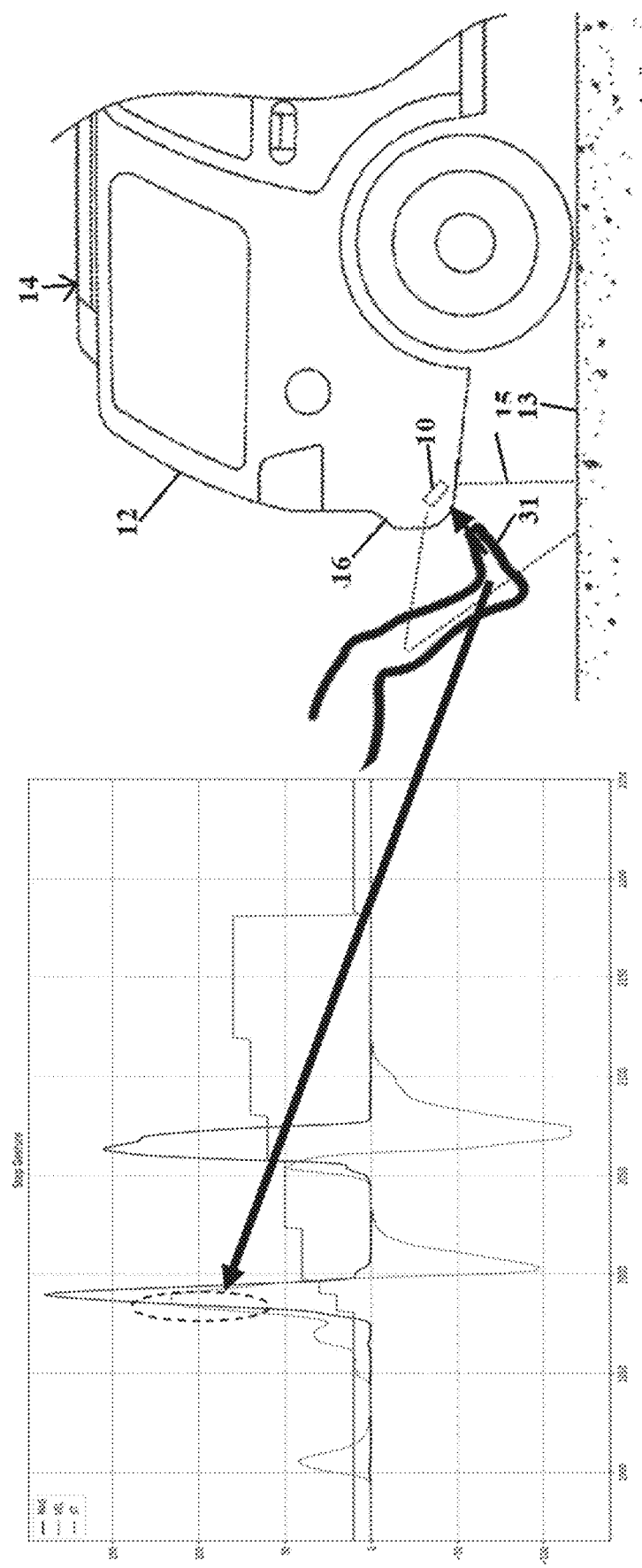

FIGS. 22 and 23 show a step in sub-gesture. As shown initially in FIG. 22, using the at least one radar sensor subassembly 25, 25', 25", 25''', the controller 24 detects reflected radar waves corresponding with the velocity characteristic and amplitude characteristic being above a step in threshold indicating that the foot has entered the detection zone 15. Consequently, the controller 24 transitions from the first or monitor mode to the second or step in detecting mode. Referring to FIG. 23, both the velocity characteristic and the amplitude characteristic are positive (i.e., have a positive sign). In other words, both a time plotted velocity characteristic and time plotted amplitude characteristic are rising in the positive direction and above the step in threshold for the step in sub-gesture. While both the amplitude and velocity characteristics are shown to be positive rising edges and above the corresponding thresholds (both velocity and amplitude), they do not have to be in the same rate, since it depends on different user's step gesture and rate as well (slow, fast or normal and the way the user does their steps, etc.).

Figure 24:
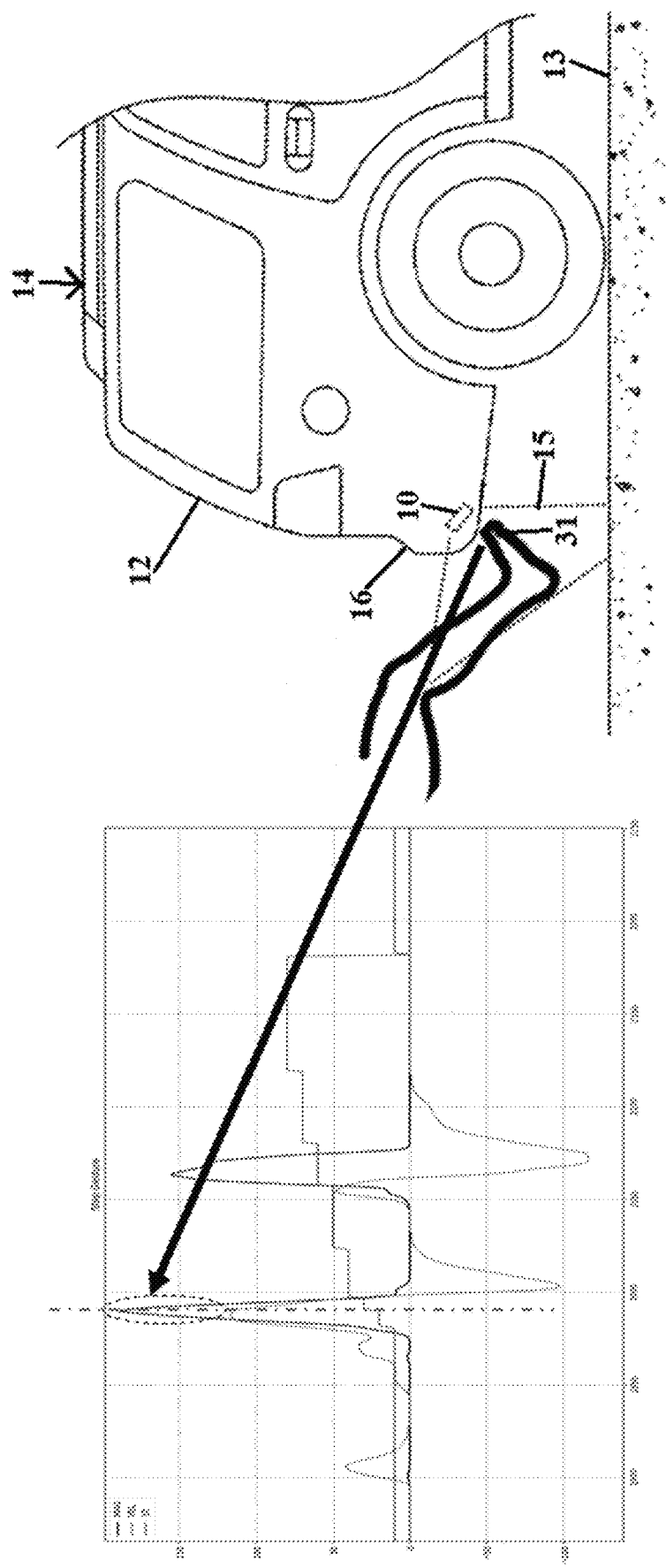
FIGS. 24 and 25 show a step down sub-gesture according to aspects of the disclosure.
Figure 25:
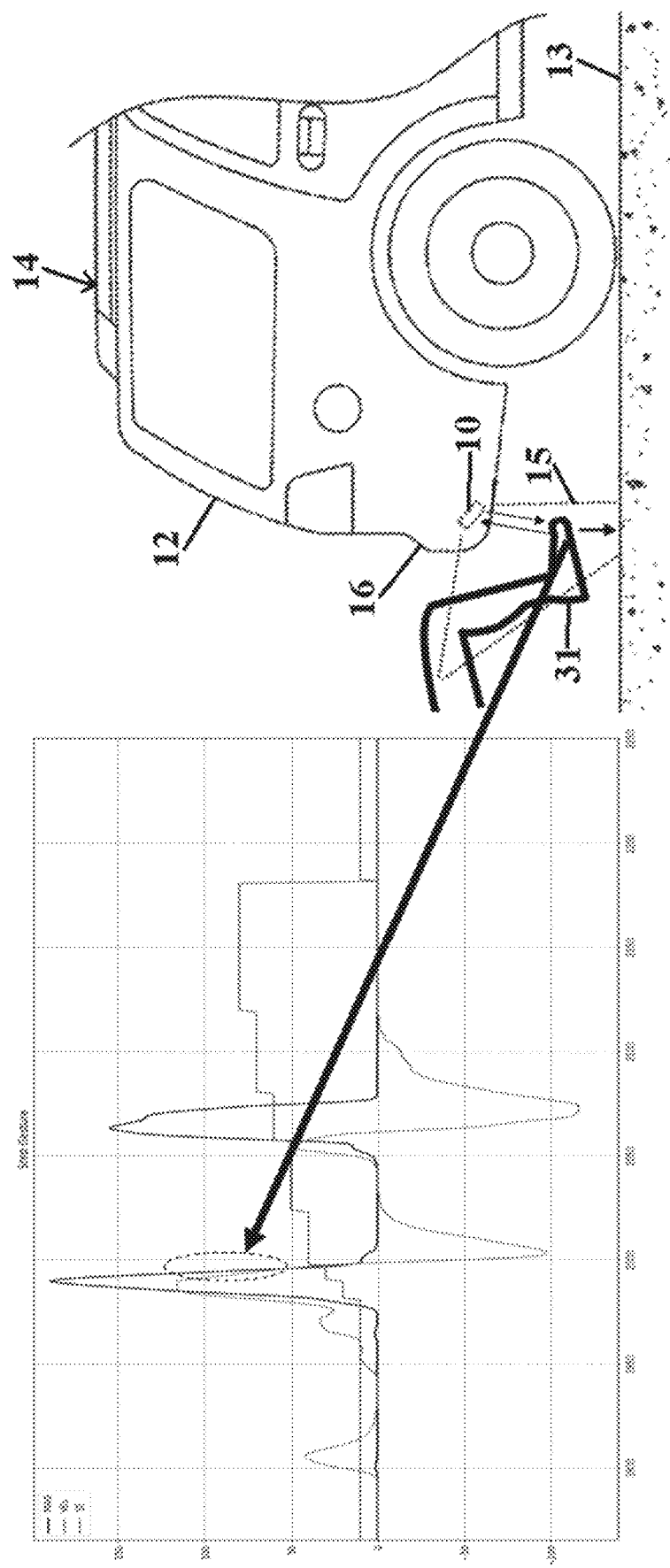

FIGS. 24 and 25 show a step down sub-gesture. Referring first to FIG. 24, both the velocity characteristic and amplitude characteristic indicate the foot or object 31 has completed its first sub-gesture (the step in sub-gesture) and is beginning a next sub gesture, the step down (e.g., a downward approach towards the ground 13). The controller 24 detects a peak in both the positive velocity characteristic and positive amplitude characteristic. Specifically, both the time plotted velocity characteristic and amplitude characteristic have stopped rising in the positive direction. Consequently, the controller 24 transitions from the second or step in detected mode to a third or step down monitored mode. Next referring to FIG. 20, the controller 24 detects both a negative velocity characteristic and negative amplitude characteristic. That is both the time plotted velocity characteristic and amplitude characteristic are dropping in the negative direction. However, the falling rate does not need to be considered since users may have variations in their steps. The negative velocity characteristic indicates foot moving away from the at least one sensor subassembly 25, 25', 25", 25''' and the negative amplitude characteristic confirms the foot or object 31 is moving away from the at least one sensor subassembly 25, 25', 25", 25". So, the controller 24 transitions from the third or step down monitor mode to a fourth or step down detected mode.

Figure 26:
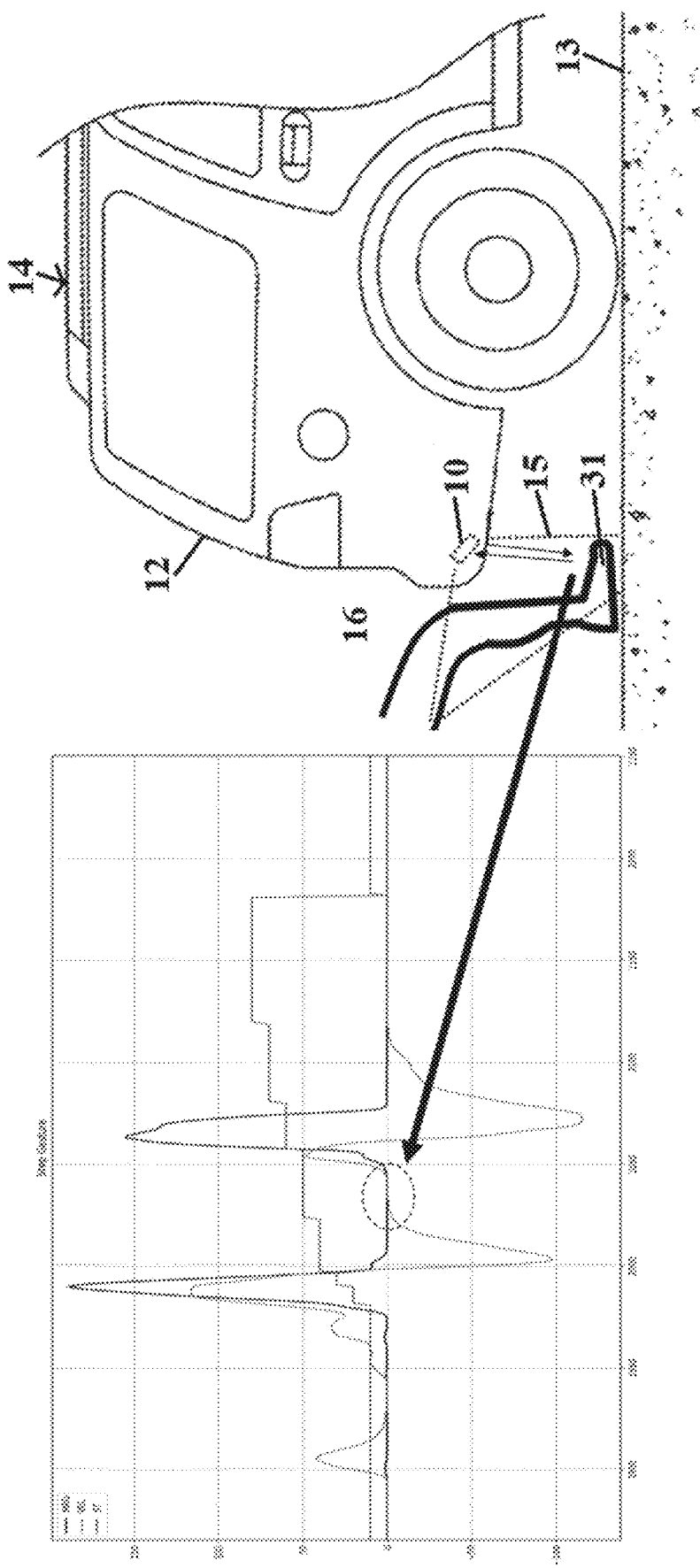
FIG. 26 shows a step hold or foot on ground sub-gesture according to aspects of the disclosure.

FIG. 26 shows a step hold or foot on ground sub-gesture (e.g., placement or foot on the ground 13 without movement for a period of time). The controller 24 detects that the velocity characteristic and amplitude characteristic are below the threshold for a minimum period of time. So, the controller 24 transitions from the fourth or step down detected to a fifth or step hold detecting mode.

Figure 27:
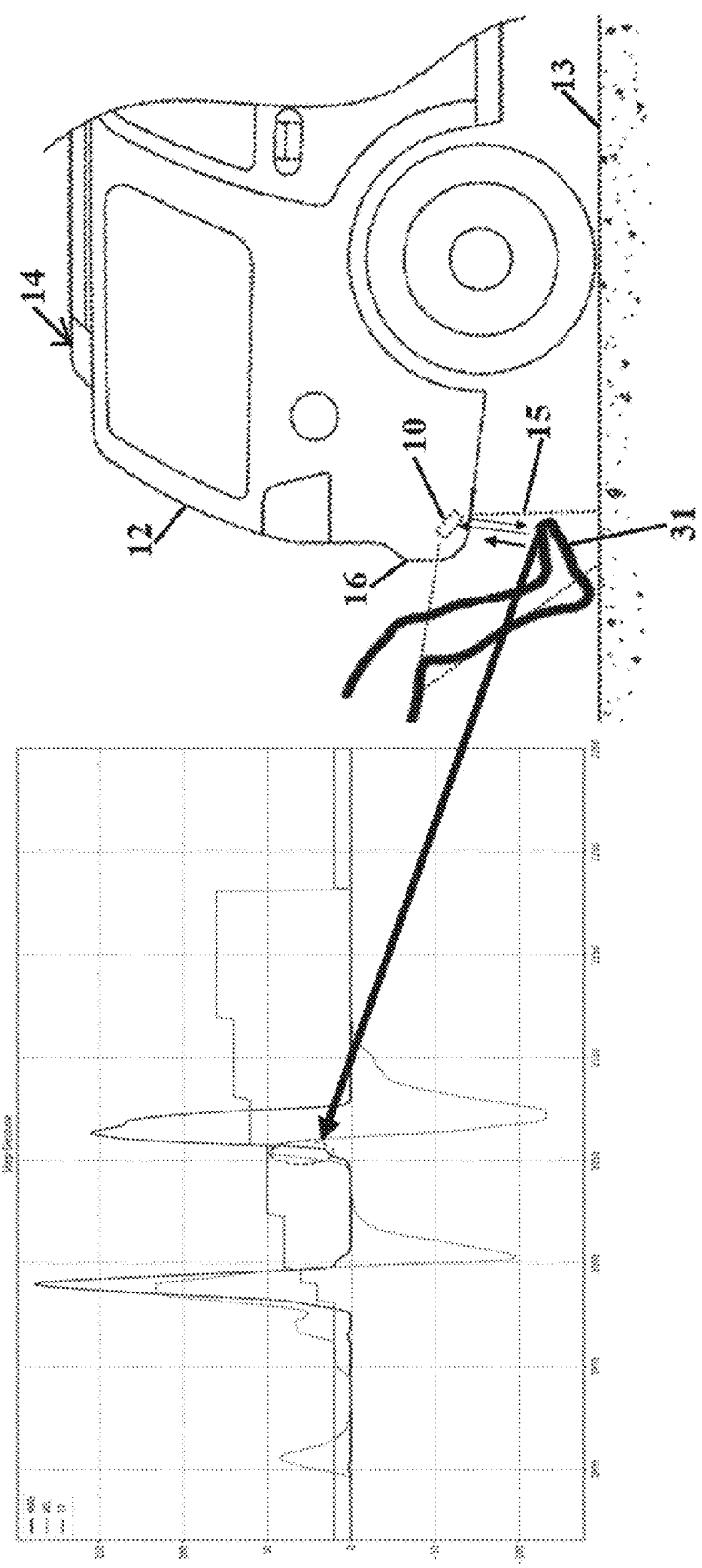
FIG. 27 shows a step up sub-gesture according to aspects of the disclosure.

FIG. 27 shows a step up sub-gesture (e.g., lifting of the foot off of the ground 13). The controller 24 detects both a positive velocity characteristic and positive amplitude characteristic. In other words, both the velocity characteristic and the amplitude characteristic are increasing in the positive direction. The positive velocity characteristic indicates foot moving towards the at least one sensor subassembly 25, 25', 25", 25''' and the positive amplitude characteristic confirms the foot 21 is moving towards at least one sensor subassembly 25, 25', 25", 25". Thus, the controller 24 transitions from the fifth or step hold detecting mode to a sixth or step up detected mode.

Figure 28:
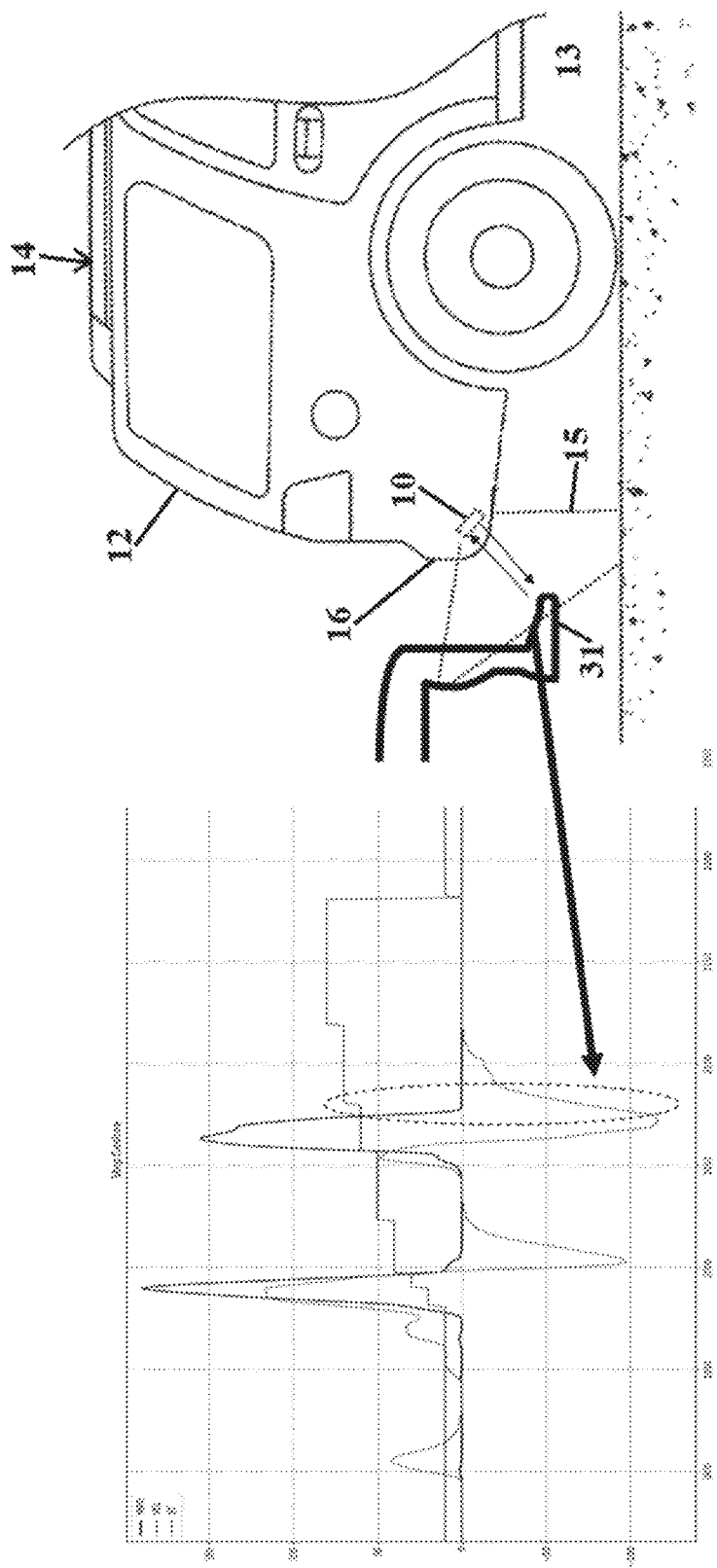
FIG. 28 shows a step out sub-gesture according to aspects of the disclosure.

FIG. 28 shows a step out sub-gesture. The controller 24 detects that the reflected radar signal (velocity characteristic and amplitude characteristic) have fallen below the threshold level for each indicating that the foot 21 has exited the detection zone 15. The controller 24 transitions from the sixth or step up detected mode to a seventh or step out detected mode. A step gesture validation process can then begin.

Figure 31:
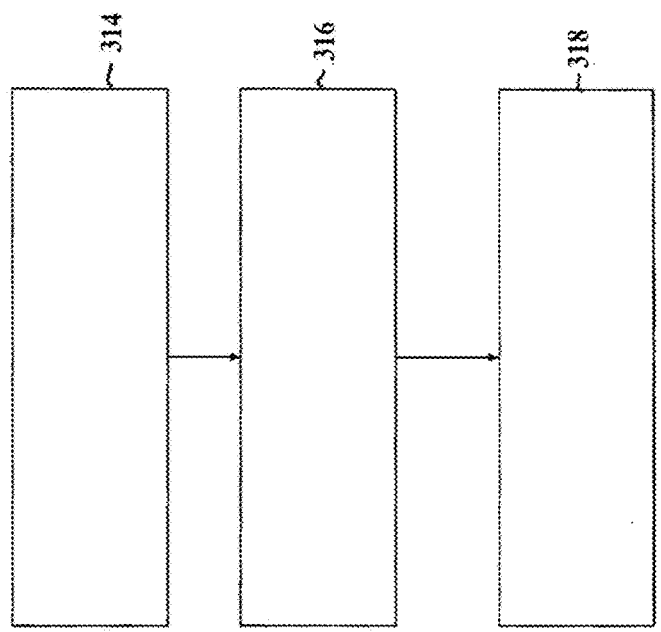
FIGS. 29-31 illustrate steps of a method of operating the detection system according to aspects of the disclosure.
Figure 30:
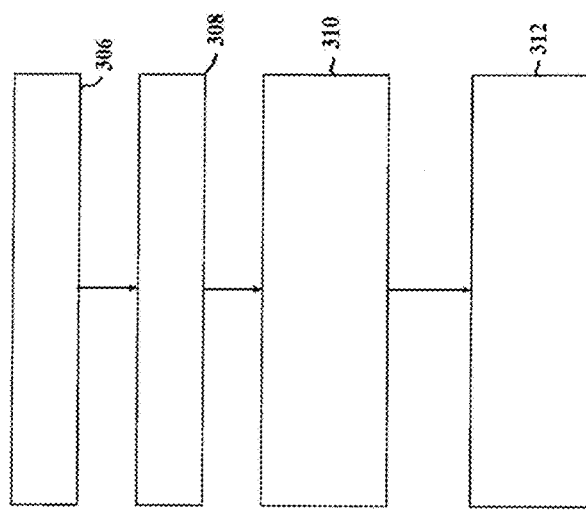
Figure 29:
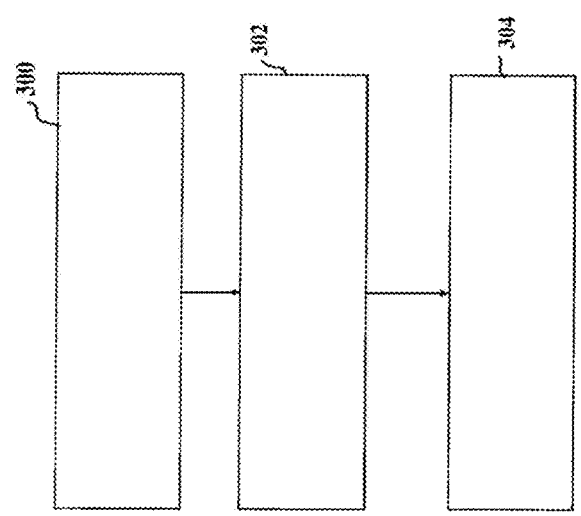

As best shown in FIGS. 29-31, a method of operating a detection system for user-activated, non-contact activation of a powered closure panel 12, 12' of a vehicle 14 are also provided. The method can include the step of receiving a user input from a gesture selector 94, 96 using a controller arrangement 24, 88, 90, 92 in communication with the gesture selector 94, 96. Next, adjusting at least one of a plurality of predetermined thresholds representing a valid activation gesture by the user required to move a closure panel 12, 12' based on the user input from the user interface 94 using the controller arrangement 24, 88, 90, 92. The method can proceed with the step of sensing a motion and characteristics of an object in a detection zone 15 using at least one sensor subassembly 25, 25', 25", 25''' coupled to the controller arrangement 24, 88, 90, 92. The method can then include the step of outputting a sensor signal corresponding to the motion and characteristics of the object 31 in the detection zone 15 using the at least one sensor subassembly 25, 25', 25", 25". As discussed above, the at least one sensor subassembly 25, 25', 25", 25''' can be a radar sensor subassembly 25, 25', 25", 25". Therefore, the step of sensing the motion and characteristics of the object 31 in the detection zone 15 using the at least one sensor subassembly 25, 25', 25", 25''' coupled to the controller arrangement 24, 88, 90, 92 can include the steps of transmitting radar waves using least one radar transmit antenna 26 of at least one radar sensor subassembly 25, 25', 25", 25''' and receiving the radar waves after reflection from the object 31 in the detection zone 15 and using at least one radar receive antenna 28 of the at least one radar sensor subassembly 25, 25', 25", 25". Then, the method can continue with the step of sensing the motion and characteristics of the object 31 in the detection zone 15 based on the radar waves received.

The next step of the method is receiving and analyzing the sensor signal from the at least one sensor assembly 25, 25', 25", 25''' using the controller arrangement 24, 88, 90, 92. The method proceeds by determining whether the sensor signal is within the plurality of predetermined thresholds using the controller arrangement 24, 88, 90, 92 and initiating movement of the closure panel 12, 12' in response to the sensor signal being within the plurality of predetermined thresholds representing the valid activation gesture using the controller arrangement 24, 88, 90, 92.

Referring to FIG. 29, in the event that the gesture selector 94, 96 is a user interface 94 configured to accept the user input from the user, the method can further include the step of 300 monitoring the user interface 94 for the user input to select one of a plurality of gesture detection modes. The method can then include the step of 302 operating a master vehicle node 90 coupled to the user interface 94 and operable with a plurality of gesture operation mode statuses 106 and a plurality of preloaded detection algorithms 108 corresponding to the user input. The next step of the method can be 304 initiating movement of the closure panel 12, 12' in response to the sensor signal being within the plurality of predetermined thresholds representing the valid activation gesture associated with the one of the plurality of gesture detection modes.

Referring to FIG. 30, the method can further include the steps of 106 assigning one of a plurality of gesture detection modes to a fob 92 in communication with the controller arrangement 24, 88, 90, 92 and 308 monitoring for an approach of the fob 92 to the vehicle 14. The method can continue by 310 operating a master vehicle node 90 coupled to the user interface 94 and operable with a plurality of gesture operation mode statuses 106 and a plurality of preloaded detection algorithms 108 corresponding to the one of the plurality of gesture detection modes assigned to the fob 92. The method can then include the step of 312 initiating movement of the closure panel 12, 12' in response to the sensor signal being within the plurality of predetermined thresholds representing the valid activation gesture associated with the one of the plurality of gesture detection modes assigned to the fob 92.

Referring to FIG. 31, the method can further include the steps of 114 detecting the connection of an electronic controller 24 of a detection module operating in one of a plurality of gesture type detection modes to a body control module operable with a plurality of gesture operation mode statuses 106 and a plurality of preloaded detection algorithms 108. The next step of the method can be 316 communicating one of the plurality of gesture operation mode statuses 106 to the body control module 88 in response to detecting the connection of the electronic controller 24 to the body control module 88. The method can proceed by 318 processing the sensor signal from the at least one sensor subassembly 25, 25', 25", 25''' using the body control module 88 with at least one of the plurality of preloaded detection algorithms 108 based on the one of the plurality of gesture operation mode statuses 106 from the electronic controller 24.

As mentioned above, the gesture selector 94, 96 can be a tool 96 for selectively coupling to the body control module 88. Consequently, the method can further include the step of selectively decoupling the body control module 88 from the electronic controller 24 of the detection module 10 in response to the tool 96 being selectively coupled to the body control module 88.

Also disclosed is a Doppler based user-activated, non-contact activation system 11, 11' for operating a closure panel 12, 12' coupled to a vehicle body 16 of a vehicle 14, comprising: at least one radar sensor subassembly 25, 25', 25", 25''' coupled to the vehicle body (e.g., bumper 16) and including at least one radar transmit antenna 26 for transmitting radar waves and at least one radar receive antenna 28 for receiving the radar waves after reflection from an object 31 in a detection zone 15 for sensing a motion of the object 31 in the detection zone and outputting a sensor signal corresponding to the motion of the object 31 in the detection zone 15; and a controller 24 coupled to the at least one radar sensor subassembly 25, 25', 25", 25''' and configured to determine a velocity characteristic and an amplitude characteristic corresponding to the motion of the object 31 in the detection zone 15 using the sensor signal and issue a command to an actuator to initiate movement of the closure panel 12, 12' in response to matching a predetermined motion with the motion determined to have a correlation between the velocity characteristic and the amplitude characteristic.

According to an aspect, the controller 24 is configured to: receive the sensor signal; determine a plurality of velocity characteristics and a plurality of amplitude characteristics based on the sensor signal representative of the motion of the object 31; analyze the plurality of velocity characteristics and the plurality of amplitude characteristics to detect a sequence of sub-gestures forming the motion; and issue a command to the actuator to initiate movement of the closure panel 12, 12' in response to the sequence of sub-gestures matching a predetermined sequence of sub-gestures.

According to an aspect, the controller 24 is configured to detect the sequence of sub-gestures consisting of at least one of the object 31 moving towards the at least one radar sensor subassembly 25, 25', 25", 25''', the object 31 moving away from the at least one radar sensor subassembly 25, 25', 25", 25''', and the object 31 not moving relative to the at least one radar sensor subassembly 25, 25', 25", 25".

According to an aspect, the controller 24 is further configured to detect an entry of the object 31 into the detection zone 15 and an exit of the object 31 out of the detection zone 15 based on the plurality of amplitude characteristics being below a predetermined amplitude threshold.

According to an aspect, the controller 24 is further configured to correlate a rate of change of the plurality of velocity characteristics with the rate of change of the plurality of amplitude characteristics to classify at least one sub-gesture of the sequence of sub-gestures.

According to an aspect, the controller 24 is further configured to correlate a peak of the plurality of velocity characteristics with a peak of the plurality of amplitude characteristics to classify the end of one of the sub-gestures and the beginning of another one of the sub-gestures.

According to an aspect, the controller 24 is further configured to: detect the object 31 moving towards the at least one radar sensor subassembly 25, 25', 25", 25''' based on analyzing the plurality of velocity characteristics and determining a positive velocity characteristic; detect the object 31 moving away from the at least one radar sensor subassembly 25, 25', 25", 25''' based on analyzing the plurality of velocity characteristics and determining a negative velocity characteristic; and detect the object 31 not moving relative to the at least one radar sensor subassembly 25, 25', 25", 25''' based on analyzing the plurality of velocity characteristics and determining no velocity characteristic.

According to an aspect, the controller 24 is further configured to: detect the object 31 moving towards the at least one radar sensor subassembly 25, 25', 25", 25''' based on analyzing the plurality of amplitude characteristics and determining a positive amplitude characteristic; detect the object 31 moving away from the at least one radar sensor subassembly 25, 25', 25", 25''' based on analyzing the plurality of amplitude characteristics and determining a negative amplitude characteristic; and detect the object 31 not moving relative to the at least one radar sensor subassembly 25, 25', 25", 25''' based on analyzing the plurality of amplitude characteristics and determining no amplitude characteristic.

According to an aspect, the controller 24 is configured to detect the object 31 moving relative to the at least one radar sensor subassembly 25, 25', 25", 25''' based on analyzing the plurality of velocity characteristics and determining a sign of the plurality of velocity characteristics and analyzing the plurality of amplitude characteristics and determining a sign of the plurality of amplitude characteristics, wherein the controller 24 is configured to determine that the object 31 is moving towards the at least one radar sensor subassembly 25, 25', 25", 25''' when the sign of both the velocity characteristic and plurality of amplitude characteristics are positive, and determine that the object 31 is moving away from the at least one radar sensor subassembly 25, 25', 25", 25''' when the sign of both the plurality of velocity characteristics and the plurality of amplitude characteristics are negative.

According to an aspect, the sequence of sub-gestures matching a predetermined sequence of sub-gestures includes the controller 24 detecting a sequence consisting of: the object 31 moving towards the at least one radar sensor subassembly 25, 25', 25", 25''', then the object 31 next moving away from the at least one radar sensor subassembly 25, 25', 25", 25''', and then the object 31 next not moving towards or away from the at least one radar sensor subassembly 25, 25', 25", 25".

According to an aspect, the sequence of sub-gestures matching a predetermined sequence of sub-gestures includes the controller 24 detecting a further sequence consisting of: the object 31 next moving towards the at least one radar sensor subassembly 25, 25', 25", 25''', the object 31 next moving away from the at least one radar sensor subassembly 25, 25', 25", 25''', and the object 31 next moving out of the detection zone 15.

According to an aspect, the controller 24 is further configured to determine if the sub-gesture whereby the object 31 is not moving towards or away from the object 31 moving away from the at least one radar sensor subassembly 25, 25', 25", 25''' occurs for a minimum predetermined amount of time.

According to an aspect, the controller 24 is further configured to determine the plurality of velocity characteristics based on Doppler shifts between the radar waves transmitted by the at least one radar transmit antenna 26 and the radar waves received by the at least one radar receive antenna 28 and determine the plurality of amplitude characteristics based on the strength of the radar waves received by the at least one radar receive antenna 28 relative to the radar waves transmitted by the at least one radar transmit antenna 26.

According to an aspect, the radar waves transmitted from the at least one radar transmit antenna 26 are unmodulated continuous wave radar waves 73 and the controller 24 is not configured to employ modulated continuous-wave techniques for determining the plurality of velocity characteristics and the plurality of amplitude characteristics.

According to an aspect, the object 31 is a foot and the at least one radar sensor subassembly 25, 25', 25", 25''' is mounted on a vehicle bumper 18 and the closure panel 12, 12' is a lift gate 12.

According to an aspect, the sequence of sub-gestures corresponds to a user performing a step in gesture and a step out gesture.

According to an aspect, the controller 24 is further configured to monitor the sensor signal and analyze the plurality of velocity characteristics and the plurality of amplitude characteristics to detect the sequence of sub-gestures in response to the at least one of the plurality of velocity characteristics and one of the plurality of amplitude characteristics being respectively above a velocity noise threshold and an amplitude noise threshold.

According to an aspect, the controller 24 is further configured to operate in a monitor mode, and transition to a step in detecting mode in response to both one of the plurality of the velocity characteristics and one of the plurality of amplitude characteristics being respectively above a velocity noise threshold and an amplitude noise threshold.

According to an aspect, the controller 24 is configured to return to the monitor mode in response to either another of the plurality of velocity characteristics and another of the plurality of amplitude characteristics being respectively below the velocity noise threshold and the amplitude noise threshold.

According to an aspect, the predetermined sequence of sub-gestures corresponds to the sequence of sub-gestures consisting of a detected first peak of each the plurality of velocity characteristics and a peak of the plurality of amplitude characteristics over a first period of time indicating a first sub-gesture to the controller 24, and a subsequently detected second peak of the plurality of velocity characteristics and a peak of the plurality of amplitude characteristics over a second period of time indicating a second sub-gesture to the controller 24.

According to an aspect, the controller 24 is further configured to reanalyze at least one of the plurality of velocity characteristics and the plurality of amplitude characteristics to confirm the detection of the detected first peak and the subsequently detected second peak.

According to an aspect, the controller 24 is further configured to correlate a slope of the plurality of velocity characteristics with a slope of the plurality of amplitude characteristics to classify the motion as a valid motion.

According to an aspect, the controller 24 is further configured to correlate a rate of change of slope of the plurality of velocity characteristics with a rate of change of the slope of the plurality of amplitude characteristics to classify the motion as a valid motion.

According to an aspect, the controller 24 is further configured to correlate a direction of the slope of the plurality of velocity characteristics with a direction of the slope of the plurality of amplitude characteristics to classify the motion as a valid motion.

Also provided is a method of detecting a gesture for operating a closure panel actuation system comprising: transmitting radar waves in a detection zone 15; receiving the radar waves after reflection from an object 31 in the detection zone 15; determining at least one velocity characteristic and at least one amplitude characteristic based on the radar waves received after reflection indicative of a motion of the object 31; determining a correlation between the at least one velocity characteristic and the at least one amplitude characteristic; matching a predetermined motion with the motion determined to have a correlation between the velocity characteristic and the amplitude characteristic; and commanding the operation of the closure panel actuation system in response to matching the predetermined motion with the motion.

According to an aspect, the method further includes the steps of: analyzing at least one of the plurality of velocity characteristics and a plurality of amplitude characteristics to detect a sequence of sub-gestures forming the motion of the object 31; and commanding the movement of the closure panel 12, 12' in response to the sequence of sub-gestures matching a predetermined sequence of sub-gestures.

According to an aspect, the step of analyzing the at least one of the plurality of velocity characteristics and the plurality of amplitude characteristics to detect a sequence of sub-gestures of the object 31 includes the steps of: identifying a step in sub-gesture in response to determining that both a first velocity characteristic of the plurality of velocity characteristics and a first amplitude characteristic of the plurality of amplitude characteristics are on a rising edge and the first velocity characteristic and the first amplitude characteristic are respectively above a velocity noise threshold and an amplitude noise threshold; identifying a step down sub-gesture in response to determining that a second velocity characteristic of the plurality of velocity characteristics is in a negative direction; identifying a foot on the ground sub-gesture in response to determining that a third velocity characteristic of the plurality of velocity characteristics and a third amplitude characteristic of the one of the plurality of amplitude characteristics are respectively below the velocity noise threshold and the amplitude noise threshold for a minimum predetermined amount of time; identifying a step up sub-gesture in response to determining that a fourth velocity characteristic of the plurality of velocity characteristics is in a positive direction; and identifying a step out sub-gesture in response to determining that a fifth velocity characteristic of the plurality of velocity characteristics is falling to the velocity noise threshold.

According to an aspect, the method further includes the step of processing a sensor signal to extract the plurality of velocity characteristics and the plurality of amplitude characteristics.

According to an aspect, the step of analyzing the at least one of the plurality of velocity characteristics and the plurality of amplitude characteristics to detect a sequence of sub-gestures of the object 31 includes the steps of: identifying one of the plurality of the velocity characteristics being positive and above a velocity noise threshold; and identifying one of the plurality of amplitude characteristics being above an amplitude noise threshold.

According to an aspect, the method further includes the step of reanalyzing at least one of the plurality of velocity characteristics and the plurality of amplitude characteristics to validate the sequence of sub-gestures.

Clearly, changes may be made to what is described and illustrated herein without, however, departing from the scope defined in the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

What is claimed is:

1. A detection system for user-activated, non-contact activation of a closure panel of a vehicle, the detection system comprising:
   a detection module including at least one sensor subassembly coupled to a vehicle body of the vehicle for detecting an object in a detection zone and sensing a motion and characteristics of the object in the detection zone and outputting a sensor signal corresponding to the motion and characteristics of the object in the detection zone;
   a gesture selector for (a) requesting a user input from the user to select a valid activation gesture to cause the detection system to initiate movement of the closure panel from among a plurality of different valid activation gestures via a graphical user interface and (b) accepting the user input from the user to select the valid activation gesture from among the plurality of different valid activation gestures via the graphical user interface; and a controller arrangement coupled to the at least one sensor subassembly and in communication with the gesture selector and configured to:
(i) receive the user input from the gesture selector selecting the valid activation gesture from among the plurality of different valid activation gestures,
(ii) adjust at least one of a plurality of predetermined thresholds based on the valid activation gesture selected by the user,
(iii) receive and analyze the sensor signal from the at least one sensor subassembly,
(iv) determine whether the sensor signal is indicative of sensing motion and characteristics of the object in the detection zone that is within the plurality of predetermined thresholds, and
(v) initiate movement of the closure panel in response to the sensor signal being indicative of sensing the motion and characteristics of the object in the detection zone that is within the plurality of predetermined thresholds.

2. The detection system as set forth in claim 1, wherein the controller arrangement is operable in a plurality of gesture type detection modes and is further configured to select one of the plurality of gesture type detection modes based on the user input.

3. The detection system as set forth in claim 2, wherein the controller arrangement includes:
an electronic controller of the detection module operating in one of the plurality of gesture type detection modes and coupled to the at least one sensor subassembly and to a power actuator of the closure panel and including a module local interconnect network interface;
a body control module coupled the electronic controller and including a body control local interconnect network interface;
a master vehicle node operable with a plurality of gesture operation mode statuses and a plurality of preloaded detection algorithms corresponding to the user input and coupled the electronic controller and including a master node local interconnect network interface and coupled to the body control module and in communication with the gesture selector; and
wherein the detection system further includes a fob in communication with at least one of the electronic controller and the body control module.

4. The detection system as set forth in claim 3, wherein the gesture selector is a user interface configured to accept the user input from the user.

5. The detection system as set forth in claim 2, wherein the controller arrangement includes:
an electronic controller of the detection module operating in one of the plurality of gesture type detection modes and coupled to the at least one sensor subassembly and to a power actuator of the closure panel and including a module local interconnect network interface;
a body control module operable with a plurality of gesture operation mode statuses and a plurality of preloaded detection algorithms and coupled the electronic controller and including a body control local interconnect network interface; and
wherein the detection system further includes a fob in communication with at least one of the electronic controller and the body control module and wherein the electronic controller is configured to communicate an operating mode to the body control module.

6. The detection system as set forth in claim 3, wherein the gesture selector is a tool for selectively coupling to the body control module through the body control local interconnect network interface.

7. A method of operating a detection system for user-activated, non-contact activation of a closure panel of a vehicle, the method comprising the steps of:
requesting a user input from a user to select a valid activation gesture to cause the detection system to initiate movement of the closure panel from among a plurality of different valid activation gestures via a graphical user interface;
receiving the user input from a gesture selector using a controller arrangement in communication with the gesture selector, the user input representative of the selection of the valid activation gesture from among the plurality of different valid activation gestures via the graphical user interface;
adjusting at least one of a plurality of predetermined thresholds based on the valid activation gesture selected by the user from the gesture selector using the controller arrangement;
sensing a motion and characteristics of an object in a detection zone using at least one sensor subassembly coupled to the controller arrangement;
outputting a sensor signal corresponding to the motion and characteristics of the object in the detection zone using the at least one sensor subassembly;
receiving and analyzing the sensor signal from the at least one sensor subassembly using the controller arrangement;
determining whether the sensor signal is indicative of sensing motion and characteristics of the object in the detection zone that is within the plurality of predetermined thresholds using the controller arrangement; and
initiating movement of the closure panel in response to the sensor signal being indicative of sensing motion and characteristics of the object in the detection zone that is within the plurality of predetermined thresholds.

8. The method as set forth in claim 7, wherein the at least one sensor subassembly is a radar sensor subassembly and the step of sensing the motion and characteristics of the object in the detection zone using the at least one sensor subassembly coupled to the controller arrangement includes the steps of:
transmitting radar waves using least one radar transmit antenna of the at least one sensor subassembly;
receiving the radar waves after reflection from the object in the detection zone and using at least one radar receive antenna of the at least one sensor subassembly; and
sensing the motion and characteristics of the object in the detection zone based on the radar waves received.

9. The method as set forth in claim 7, wherein the gesture selector is a user interface configured to accept the user input from the user and the method further includes the steps of:
monitoring the user interface for the user input to select one of a plurality of gesture detection modes;
operating a master vehicle node coupled to the user interface and operable with a plurality of gesture operation mode statuses and a plurality of preloaded detection algorithms corresponding to the user input; and
initiating movement of the closure panel in response to the sensor signal being within the plurality of predetermined thresholds representing the valid activation gesture associated with the one of the plurality of gesture detection modes.

10. The method as set forth in claim 7, further including the steps of:
    detecting a connection of an electronic controller of a detection module operating in one of a plurality of gesture type detection modes to a body control module operable with a plurality of gesture operation mode statuses and a plurality of preloaded detection algorithms;
    communicating one of the plurality of gesture operation mode statuses to the body control module in response to detecting the connection of the electronic controller to the body control module; and
    processing the sensor signal from the at least one sensor subassembly using the body control module with at least one of the plurality of preloaded detection algorithms based on the one of the plurality of gesture operation mode statuses from the electronic controller.

11. A detection system for user-activated, non-contact activation of a closure panel of a vehicle, the detection system comprising:
    at least one radar sensor disposed at the vehicle for sensing motion of a person's foot in a detection zone and outputting a sensor signal based at least in part on the sensed motion of the person's foot in the detection zone;
    wherein the at least one radar sensor comprises (i) at least one radar transmit antenna that transmits radar waves and (ii) at least one radar receive antenna that receives radar waves;
    wherein the closure panel comprises a rear powered lift gate of the vehicle, and wherein the detection zone is exterior the rear powered lift gate of the vehicle;
    a controller disposed at the vehicle, wherein the controller requests a user input from a user to select a valid activation gesture to cause the detection system to initiate movement of the closure panel from among a plurality of different valid activation gestures via a graphical user interface;
    wherein the controller, based at least in part on receiving the user input of the selection of the valid activation gesture from among the plurality of different valid activation gestures via the graphical user interface, adjusts a threshold based on the valid activation gesture selected by the user;
    wherein, responsive to processing at the controller of the sensor signal output by the at least one radar sensor, the detection system determines whether the sensor signal is indicative of sensing motion and characteristics of the object in the detection zone that is within the threshold for the valid activation gesture; and
    wherein, responsive to determining that the sensor signal is indicative of sensing motion and characteristics of the object in the detection zone that is within the threshold for the valid activation gesture, the detection system generates an output to move the closure panel.

12. The detection system as set forth in claim 11, wherein the controller, based at least in part on the user input, adjusts a plurality of thresholds for the valid activation gesture required to move the closure panel.

13. The detection system as set forth in claim 11, wherein the user input represents a threshold parameter selected by a user from a plurality of threshold parameters.

14. The detection system as set forth in claim 11, wherein the controller is operable in a plurality of gesture type detection modes, and wherein the controller operates in a selected one of the plurality of gesture type detection modes based at least in part on the user input.

15. The detection system as set forth in claim 11, wherein the controller and the at least one radar sensor are part of a detection module.

16. The detection system as set forth in claim 11, wherein the controller is electrically connected to a power actuator of the closure panel via a local interconnect network interface.

17. The detection system as set forth in claim 16, comprising a body control module electrically connected to the controller via a body control local interconnect network interface.

18. The detection system as set forth in claim 17, comprising a fob in communication with at least one of the controller and the body control module.

19. The detection system as set forth in claim 17, comprising a master vehicle node configured with a plurality of gesture operation mode statuses and a plurality of preloaded detection algorithms corresponding to a plurality of user inputs, wherein the master vehicle node is electrically connected to the controller via a master node local interconnect network interface.

20. The detection system as set forth in claim 11, wherein the detection system, responsive to processing at the controller of the sensor signal output by the at least one radar sensor, (i) determines a plurality of characteristics of the motion of the person's foot, (ii) determines a sequence of sub-gestures forming the motion of the person's foot based at least in part on the determined plurality of characteristics, and (iii) determines whether the determined sequence of sub-gestures of the person's foot match a predetermined sequence of sub-gestures.

* * * * *

UNITED STATES PATENT AND TRADEMARK OFFICE
CERTIFICATE OF CORRECTION

PATENT NO. : 12,333,082 B2
APPLICATION NO. : 17/595854
DATED : June 17, 2025
INVENTOR(S) : Allan Corner et al.

Page 1 of 2

It is certified that error appears in the above-identified patent and that said Letters Patent is hereby corrected as shown below:

In the Specification

Column 1
Lines 7-9, "International Patent Application No. PCT/CA2020/050673, filed May 19, 2020," should be --The present application is a 371 national stage entry of PCT International Patent Application No. PCT/CA2020/050673, filed May 19, 2020,--

Column 5
Line 51, "fora powered" should be --for a powered--

Column 6
Lines 22-23, "detection module" should be --detection module 10--
Line 25, "detection module can" should be --detection module 10 can--
Line 33, "sensor subassembly" should be --sensor subassembly 25--
Lines 34-35, "sensor printed circuit board (PCB)" should be --sensor printed circuit board 30 (PCB)--

Column 9
Lines 51-52, "sensor subassembly" should be --sensor subassembly 25--
Line 62, "detection zone" should be --detection zone 15--

Column 17
Line 44, "first detection angle 81" should be --first detection angle θ1--
Line 47, "second detection angle 82." should be --second detection angle θ2.--

Column 18
Line 8, "detection angles 81, 82" should be --detection angles θ1, θ2--

Signed and Sealed this
Fifteenth Day of July, 2025

Coke Morgan Stewart
*Acting Director of the United States Patent and Trademark Office*

Column 21
Line 40, "detection module" should be --detection module 10"--

Column 22
Line 4, "detection zone" should be --detection zone 15--